US009387489B2

(12) United States Patent
Charlot et al.

(10) Patent No.: US 9,387,489 B2
(45) Date of Patent: Jul. 12, 2016

(54) DEVICES FOR SEPARATION OF BIOLOGICAL MATERIALS

(71) Applicant: Biological Dynamics, Inc., San Diego, CA (US)

(72) Inventors: David Charlot, San Diego, CA (US); Juan Pablo Hinestrosa Salazar, San Diego, CA (US); Irina V. Dobrovolskaya, La Jolla, CA (US); Kai Yang, San Diego, CA (US); Paul Swanson, Santee, CA (US); Rajaram Krishnan, San Diego, CA (US)

(73) Assignee: BIOLOGICAL DYNAMICS, INC., San Diego, CA (US)

( * ) Notice: Subject to any disclaimer, the term of this patent is extended or adjusted under 35 U.S.C. 154(b) by 0 days.

(21) Appl. No.: 14/680,819

(22) Filed: Apr. 7, 2015

(65) Prior Publication Data

US 2015/0283553 A1 Oct. 8, 2015

Related U.S. Application Data

(60) Provisional application No. 61/977,006, filed on Apr. 8, 2014, provisional application No. 61/977,249, filed on Apr. 9, 2014.

(51) Int. Cl.

| | |
|---|---|
| ***G01N 27/447*** | (2006.01) |
| ***B03C 5/00*** | (2006.01) |
| ***B03C 5/02*** | (2006.01) |

(52) U.S. Cl.

CPC ................ *B03C 5/005* (2013.01); *B03C 5/026* (2013.01); *B03C 2201/26* (2013.01)

(58) Field of Classification Search

CPC .......... B03C 5/005; B03C 5/022; B03C 5/028

See application file for complete search history.

(56) References Cited

U.S. PATENT DOCUMENTS

| | | | |
|---|---|---|---|
| 5,632,957 A | 5/1997 | Heller et al. | |
| 6,203,683 B1 | 3/2001 | Austin et al. | |
| 6,280,590 B1 | 8/2001 | Cheng et al. | |
| 6,403,367 B1 | 6/2002 | Cheng et al. | |
| 6,749,736 B1 | 6/2004 | Fuhr et al. | |
| 6,824,664 B1 | 11/2004 | Austin et al. | |
| 7,081,189 B2 * | 7/2006 | Squires | B01D 61/56 204/451 |

(Continued)

FOREIGN PATENT DOCUMENTS

| | | |
|---|---|---|
| CN | 1337580 A | 2/2002 |
| CN | 1348100 A | 5/2002 |

(Continued)

OTHER PUBLICATIONS

PCT/US2015/24624 International Search Report and Written Opinion dated Aug. 21, 2015.

(Continued)

*Primary Examiner* — Alexander Noguerola

(74) *Attorney, Agent, or Firm* — Wilson Sonsini Goodrich & Rosati

(57) ABSTRACT

The present invention includes methods, devices and systems for isolating nanoparticulates, including nucleic acids, from biological samples. In various aspects, the methods, devices and systems may allow for a rapid procedure that requires a minimal amount of material and/or results in high purity isolation of biological components from complex fluids such as blood or environmental samples.

30 Claims, 8 Drawing Sheets

(56) References Cited

U.S. PATENT DOCUMENTS

| | | | | |
|---|---|---|---|---|
| 7,105,081 | B2 | 9/2006 | Gascoyne et al. | |
| 7,709,262 | B2 | 5/2010 | Cantor et al. | |
| 8,425,750 | B2 * | 4/2013 | Sugioka | B01D 61/427 204/643 |
| 8,603,791 | B2 | 12/2013 | Krishnan et al. | |
| 8,815,554 | B2 | 8/2014 | Krishnan et al. | |
| 8,815,555 | B2 | 8/2014 | Krishnan et al. | |
| 8,871,481 | B2 | 10/2014 | Krishnan et al. | |
| 8,877,470 | B2 | 11/2014 | Krishnan et al. | |
| 8,932,447 | B2 | 1/2015 | Heller et al. | |
| 8,932,815 | B2 | 1/2015 | Krishnan et al. | |
| 8,969,059 | B2 | 3/2015 | Krishnan et al. | |
| 9,005,941 | B2 | 4/2015 | Krishnan et al. | |
| 2001/0045359 | A1 | 11/2001 | Cheng et al. | |
| 2002/0036142 | A1 | 3/2002 | Gascoyne et al. | |
| 2003/0146100 | A1 | 8/2003 | Huang et al. | |
| 2004/0011651 | A1 | 1/2004 | Becker et al. | |
| 2006/0063183 | A1 | 3/2006 | Segawa et al. | |
| 2006/0102482 | A1 | 5/2006 | Auerswald et al. | |
| 2006/0289341 | A1 | 12/2006 | Muller et al. | |
| 2007/0080062 | A1 * | 4/2007 | Harnett | B03C 5/005 204/450 |
| 2007/0095669 | A1 | 5/2007 | Lau et al. | |
| 2007/0125650 | A1 | 6/2007 | Scurati et al. | |
| 2007/0131554 | A1 | 6/2007 | Yu et al. | |
| 2007/0152206 | A1 * | 7/2007 | Cho | B03C 5/026 257/10 |
| 2007/0240495 | A1 | 10/2007 | Hirahara | |
| 2007/0284254 | A1 | 12/2007 | Cho et al. | |
| 2009/0314644 | A1 | 12/2009 | Golan et al. | |
| 2011/0108422 | A1 | 5/2011 | Heller et al. | |
| 2011/0139620 | A1 * | 6/2011 | Stumber | B01F 5/061 204/451 |
| 2013/0273640 | A1 | 10/2013 | Krishnan et al. | |
| 2014/0054172 | A1 | 2/2014 | Jonsson et al. | |
| 2014/0066317 | A1 | 3/2014 | Talasaz | |
| 2014/0093871 | A1 | 4/2014 | Shieh et al. | |
| 2014/0127697 | A1 | 5/2014 | Krishnan et al. | |
| 2015/0083595 | A1 | 3/2015 | Krishnan et al. | |
| 2015/0104858 | A1 | 4/2015 | Krishnan et al. | |

FOREIGN PATENT DOCUMENTS

| | | | |
|---|---|---|---|
| CN | 102320559 | A | 1/2012 |
| EP | 1775589 | A1 | 4/2007 |
| JP | 2001500252 | A | 1/2001 |
| JP | 2002502047 | A | 1/2002 |
| JP | 2004532968 | A | 10/2004 |
| WO | WO-9804355 | A1 | 2/1998 |
| WO | WO-9938612 | A1 | 8/1999 |
| WO | WO-0196025 | A2 | 12/2001 |
| WO | WO-2005012872 | A2 | 2/2005 |
| WO | WO-2005121767 | A1 | 12/2005 |
| WO | WO-2006018981 | A1 | 2/2006 |
| WO | WO-2007107910 | A1 | 9/2007 |
| WO | WO-2009146143 | A2 | 12/2009 |
| WO | WO-2014015187 | A1 | 1/2014 |
| WO | WO-2014028222 | A1 | 2/2014 |

OTHER PUBLICATIONS

PCT/US2015/036789 International Search Report and Written Opinion dated Sep. 29, 2015.

U.S. Appl. No. 14/063,884 Office Action dated Feb. 12, 2014.

Asbury et al. Trapping of DNA by dielectrophoresis. Electrophoresis 23:2658-2666 (2002).

Asbury et al. Trapping of DNA in Nonuniform Oscillating Electric Fields. Biophys J. 74:1024-1030 (1998).

Becker et al. Separation of Human Breast Cancer Cells From Blood by Differential Dielectric Affinity. Proceedings of the National Academy of Sciences 92:860-864 (1995).

Becker et al. The removal of human leukemia cells from blood using interdigitated microelectrodes. J Phys. D: Appl. Phys. 27:2659-2662 (1994).

Bettegowda et al. Detection of Circulating Tumor DNA in Early- and Late-Stage Human Malignancies, Sci Transl Med. Feb. 19, 2014, vol. 6 pp. 224.

Board et al. DNA Methylation in Circulating Tumour DNA as a Biomarker for Cancer. Biomark Insights 2:307-19 (2007).

Board et al. Isolation and extraction of circulating tumor DNA from patients with small cell lung cancer. Ann. N. Y. Acad. Sci. 1137:98-107 (Aug. 2008).

Cairns. Detection of promoter hypermethylation of tumor suppressor genes in urine from kidney cancer patients. Ann N Y Acad Sci. 1022:40-3 (Jun. 2004).

Casciano et al. Circulating Tumor Nucleic Acids: Perspective in Breast Cancer. Breast Care 5:75-80 (2010).

Catarino et al. Quantification of Free circulating tumor DNA as a diagnostic marker for breast cancer. DNA Cell Biol. 27(8):415-421 (Aug. 2008).

Chan. Circulating EBV DNA as a tumor marker for nasopharyngeal carcinoma. Semin Cancer Biol. 12(6):489-496 (Dec. 2002).

Chan et al. Persistent Aberrations in Circulating DNA Integrity after Radiotherapy are Associated with Poor Prognosis in Nasopharyngeal Carcinoma Patients. Clinical Cancer Research 14(13):4141-4145 (2008).

Chan et al. Quantitative Analysis of Circulating Methylated DNA as a Biomarker for Hepatocellular Carcinoma. Clinical Chemistry 54(9):1528-1536 (2008).

Chan et al. Radiological, pathological and DNA remission in recurrent metastatic nasopharyngeal carcinoma. BMC Cancer 6:259 (Oct. 31, 2006).

Chang et al. Nasopharyngeal carcinoma. Annals of Oncology 13:1007-1015 (2002).

Cheng et al. Preparation and Hybridization Analysis of DNA/A from *E. coli* on Microfabricated Bioelectronic Chips. Nature Biotechnology 16:541-546 (1998).

Cheng et al. Quantification of circulating cell-free DNA in the plasma of cancer patients during radiation therapy. Cancer Science 100(2):303-309 (Feb. 2009).

Ching et al. Isolation of Cultured Cervical Carcinoma Cells Mixed with Peripheral Blood Cells on a Bioelectronic Chip. Analytical Chemistry 70(11):2321-2326 (1998).

Chuang et al. Detectable BRAF mutation n serum DNA samples from patients with papillary thyroid carcinomas. Head Neck 32(2):229-234 (2010).

Chun et al. Circulating tumour-associated plasma DNA represents an independent and informative predictor of prostate cancer. BJU International 98(3):544-548 (2006).

Combaret et al. Circulating MYCN DNA as a Tumor-specific Marker in Neuroblastoma Patients. Cancer Research 62:3646-3648 (Jul. 1, 2002).

Cortese et al. Epigenetic markers of prostate cancer in plasma circulating DNA. Human Molecular Genetics 21:3619-3631 (2012).

Da Silva et al. Circulating cell-free DNA in serum as a biomarker of colorectal cancer. Journal of Clinical Pathology 66(9):775-778 (Sep. 2013).

Daniotti et al. Detection of mutated BRAFV600E variant in circulating DNA of stage III-IV melanoma patients. Int. J. Cancer 120:2439-2444 (Jun. 1, 2007).

Dawson et al. Analysis of Circulating Tumor DNA to Monitor Metastatic Breast Cancer. The New England Journal of Medicine 368(13):1199-1209 (Mar. 28, 2013).

De Maio et al. Circulating and stool nucleic acid analysis for colorectal cancer diagnosis. World Journal of Gastroenterology 20(4):957-967 (Jan. 28, 2014).

Delgado. Characterization of cell-free circulating DNA in plasma in patients with prostate cancer. Tumor Biol. 34(2):983-986 (Apr. 2013).

Deligezer et al. Effect of adjuvant chemotherapy on integrity of free serum DNA in patients with breast cancer. Ann N Y Acad Sci. 1137:175-179 (Aug. 2008).

Devos et al. Circulating Methylated SEPT9 DNA in Plasma is a Biomarker for Colorectal Cancer. Clinical Chemistry 55(7):1337-1346 (Jul. 2009).

(56) References Cited

OTHER PUBLICATIONS

Dobrzycka. Circulating free DNA and p53 antibodies in plasma of patients with ovarian epithelial cancers. Annals of Oncology 22(5):1133-1140 (May 2011).
Dobrzycka. Circulating free DNA, p53 antibody and mutations of KRAS gene in endometrial cancer. 127(3):612-621 (Aug. 1, 2010).
El Tarhouny et al. Comparison of serum VEGF and its soluble receptor sVEGFR1 with serum cell-free DNA in patients with breast tumor. Cytokine 44(1):65-69 (Oct. 2008).
Ellinger et al. Cell-free circulating DNA: diagnostic value in patients with testicular germ cell cancer. J. Urol. 181(1):363-371 (Jan. 2009).
Ellinger et al. CpG island hypermethylation of cell-free circulating serum DNA in patients with testicular cancer. J. Urol. 182(1):324-329 (Jul. 2009).
Ellinger et al. Noncancerous PTGS2 DNA fragments of apoptotic origin in sera of prostate cancer patients qualify as diagnostic and prognostic indicators. Int. J. Cancer 122(1):138-143 (Jan. 1, 2008).
Elshimali et al. The Clinical Utilization of Circulating Cell Free DNA (CCFDNA) in Blood of Cancer Patients. Int. J. Mol. Sci. 14(9):18925-18958 (Sep. 13, 2013).
Fuhr et al. Cell manipulation and cultivation under a.c. electric field influence in highly conductive culture media. Biochimica et Biophysica Acta 1201:353-360 (1994).
Gahan et al. Circulating nucleic acids in plasma and serum: diagnosis and prognosis in cancer. EPMA Journal 1(3):503-512 (Sep. 2010).
Ganepola et al. Use of blood-based biomarkers for early diagnosis and surveillance of colorectal cancer. World Journal of Gastrointestinal Oncology 6(4):83-97 (Apr. 15, 2014).
Gautschi et al. Circulating deoxyribonucleic Acid as prognostic marker in non-small-cell lung cancer patients undergoing chemotherapy. J Clin Oncol. 22(20):4157-64 (2004).
Goessl et al. DNA Alterations in Body Fluids as Molecular Tumor Markers for Urological Malignancies. European Urology 41(6):668-676 (Jun. 2002).
Goodard et al. Handbook of Nanoscience, 2nd edition, 2007, Ch 16, p. 5-8.
Gornik et al. Free serum DNA is an early predictor of severity of acute pancreatitis. Clin Biochem. 42(1-2):38-43 (Jan. 2009).
Green et al. Ac electrokinetics: a survey of sub-micrometre particle dynamics. J. Phys. D: Appl. Phys. 33:632-641 (2000).
Guan et al. Analysis of circulating DNA level in the plasma of cervical cancer patients. Nan fang Yi Ke Da Xue Xue Bao 28(9):1663-1667 (Aug. 2008) (English Abstract).
Hashad et al. Free circulating tumor DNA as a diagnostic marker for breast cancer. J Clin Lab Anal. 26(6):467-472 (Nov. 2012).
Higgins et al. Variant Ciz1 is a circulating biomarker for early-stage lung cancer. Proc. Natl. Acad. Sci. USA 109(45):E3128-3135 (Nov. 6, 2012).
Higuchi. Chromosomal DNA fragmentation inapoptosis and necrosis induced by oxidative stress. Biochem Pharacol. 66:1527-35. 2003.
Higuchi et al. Appearance of 1-2 Mbp giant DNA fragments as an early common response leading to cell death induced by various substances that cause oxidative stress. Free Radical Biology & Medicine 23:90-99 (1997).
Hoffmann et al. Methylated DAPK and APC promoter DNA detection in peripheral blood is significantly associated with apparent residual tumor and outcome. J Cancer Res Clin Oncol.135(89):1231-1237 (Sep. 2009).
Hoffmann et al. Universal protocol for grafting PCR primers onto various lab-on-a-chip substrates for solid-phase PCR. RSC Advances 2:3885-3889 (2012).
Hohaus et al. Cell-free circulating DNA in Hodgkin's and non-Hodgkin's lymphomas. Annals of Oncology 20(8):1408-1413 (2009).
Holzel et al. Trapping Single Molecules by Dielectrophoresis. Phys. Rev. Left. 95:128102 (2005).
Hosny et al. Ser-249 TP53 and CTNNB1 mutations in circulating free DNA of Egyptian patients with hepatocellular carcinoma versus chronic liver diseases. Cancer Lett. 264(2):201-208 (Jun. 18, 2008).
Huang et al. Dielectrophoretic Cell Separation 20 and Gene Expression Profiling on Microelectronic Chip Arrays. Analytical Chem. 74:3362-3371 (2002).
Huang et al. Electric Manipulation ofBioparic1 es and Macromolecules on Microfabricated Electrodes. Analytical Chemistry (73):1549-1559 (2001).
Huang et al. Functionalization of Surfaces by Water-Accelerated Atom-Transfer Radical Polymerization of Hydroxyethyl Methacrylate and Subsequent Derivatization. Macromolecules 35:1175-1179 (2002).
Hughes et al. Dielectrophoretic Characterization and Separation of Antibody-Coated Submicrometer Latex Spheres. Anal Chem., 1999, 71: 3441-3445.
Hughes et al. Dielectrophoretic Manipulation and Characterization of Herpes Simplex Virus-1 Capsids. Eur Biophys J 30: 268-272 (2001).
Hughes. Nanoparticle Manipulation by Electrostatic Forces, Handbook of Nanoscience, Engineering & Technology 2nd Ed., WA Goddard III, DW Brenner, S. Lyshenski & G. Iafrate (eds.) (CRC Press 2007), pp. 16-1 to 16-32.
Hughes. Strategies for Dielectrophoretic Separation in Laboratory-on-a-chip Systems. Electrophoresis 23: 2569-2582 (2002).
Iida et al. Relation between serum levels of cell-free DNA and inflammation status in hepatitis C virus-related hepatocellular carcinoma. Oncology Reports 20(4):761-765 (Oct. 2008).
Iizuka et al. Elevated Levels of Circulating Cell-free DNA in the Blood of Patients with Hepatitis C Virus-associated Hepatocellular Carcinoma. Anticancer Research 26(6C):4713-4720 (2006).
Jiang et al. Dynamic monitoring of plasma circulating DNA in patients with acute myeloid leukemia and its clinical significance. Zhingguo Shi Yan Xue Ye Xue Za Zhi 20(1):53-56 (Feb. 2012).
Jiang et al. Increased plasma DNA integrity index in head and neck cancer patients. Int. J. Cancer 119(11):2673-2676 (Dec. 2006).
Jin et al. Circulating DNA—Important Biomarker of Cancer. Journal of Molecular Biomarkers & Diagnosis S2 (2012).
Kakimoto et al. Microsatellite analysis of serum DNA in patients with oral squamous cell carcinoma. Oncology Reports 20(5):1195-1200 (Nov. 2008).
Kolesnikova et al. Circulating DNA in the blood of gastric cancer patients. Ann N Y Acad Sci. 1137:226-231 (Aug. 2008).
Krishnan et al. Alternating current electrokinetic separation and detection of DNA nanoparticles in high-conductance solutions. Electrophoresis 29(9): 1765-1774 (2008).
Krishnan et al. An AC electrokinetic method for enhanced detection of DNA nanoparticles. J. Biophotonics 2(4):253-61 (2009).
Krishnan et al. Interaction of nanoparticles at the DEP microelectrode interface under high conductance conditions. Electrochem. Comm. 11(8):1661-1666 (2009).
Kuhlmann et al. LOH at 6q and 10q in fractionated circulating DNA of ovarian cancer patients is predictive for tumor cell spread and overall survival. BMC Cancer 12:3525 (Jul. 31, 2012).
Lavon et al. Serum DNA can define tumor-specific genetic and epigenetic markers in gliomas of various grades. Neuro-Oncology 12(2):173-180 (2010).
Lee et al. Methylation of TMEFF2 Gene in Tissue and Serum DNA from Patients with Non-Small Cell Lung Cancer. Molecules and Cells 34(2):171-176 (Aug. 31, 2012).
Liggett et al. Differential Methylation of Cell-Free Circulating DNA Among Patients With Pancreatic Cancer Versus Chronic Pancreatitis. Cancer 116(7):1674-1680 (Apr. 1, 2010).
Liggett et al. Methylation patterns in cell-free plasma DNA reflect removal of the primary tumor and drug treatment of breast cancer patients. Int. J. Cancer 128(2):492-499 (Jan. 15, 2011).
Lo Nigro et al. Methylated Tissue Factor Pathway Inhibitor 2 (TFPI2) DNA in Serum is a Biomarker of Metastatic Melanoma. Journal of Investigative Dermatology 133(5):1278-1285 (May 2013).
Lofton-Day et al. DNA Methylation Biomarkers for Blood-Based Colorectal Cancer Screening. Clinical Chemistry 54(2):414-423 (Feb. 2008).
Ma et al. Detection of circulating hypermethylated tumor-specific RASSF1A DNA in ovarian cancer patients. Zhonghua Bing Li Xue Za Zhi. 34(12):785-787 (Dec. 2005) (abstract only).

(56) References Cited

OTHER PUBLICATIONS

Ma et al. Methylated DNA and microRNA in Body Fluids as Biomarkers for Cancer Detection. International Journal of Molecular Sciences 14(5):10307-10331 (May 16, 2013).
Majchrzak et al. Detection of MGMT, RASSF1A, p15INK4B, and p14ARF promoter methylation in circulating tumor-derived DNA of central nervous system cancer patients. J. Appl. Genetics 54:335-344 (2013).
Melnikov et al. Methylation profile of circulating plasma DNA in patients with pancreatic cancer. J Surg Oncol. 99(2):119-22 (Feb. 2009).
Mirza et al. Clinical significance of promoter hypermethylation of ERβ and RARβ2 in tumor and serum DNA in Indian breast cancer patients. Ann Surg Oncol. 19(9):3107-15 (Sep. 2012).
Misale et al. Emergence of KRAS mutations and acquired resistance to anti EGFR therapy in colorectal cancer. Nature 486(7404):532-536 (Jun. 28, 2012).
Misawa et al. RASSF1A hypermethylation in pretreatment serum DNA of neuroblastoma patients: a prognostic marker. British Journal of Cancer 100:399-404 (2009).
Morgan et al. Separation of Sub micron Bioparticles by Dielectrophoresis Biophysical Journal. 77:516-525 (1999).
Mouliere et al. Circulating Cell-Free DNA from Colorectal Cancer Patients May Reveal High KRAS or BRAF Mutation Load. Translational Oncology 6(3):319-328 (Jun. 2013).
Muller et al. DNA Methylation in Serum of Breast Cancer Patients: An Independent Prognostic Marker. Cancer Research 63(22):7641-7645 (Nov. 15, 2003).
Muller et al. Identification of Loss of Heterozygosity on Circulating Free DNA in Peripheral Blood of Prostate Cancer Patients: Potential and Technical Improvements. Clinical Chemistry 54(4):688-696 (Apr. 2008).
Nakagawa et al. Fabrication of amino Silane-Coated Microchip for DNA extraction from Whole Blood. Journal of Biotechnology 116(2):105-111 (2005).
Nakamoto et al. Detection of Microsatellite Alterations in Plasma DNA of Malignant Mucosal Melanoma Using Whole Genome Amplification. Bull Tokyo Dent. Coll. 49(2):77-87 (May 2008).
Nakamura et al. Application of a Highly Sensitive Detection System for Epidermal Growth Factor Receptor Mutations in Plasma DNA. Journal of Thoracic Oncology 7(9):1369-1381 (Sep. 2012).
Nakayama et al. A Highly Sensitive Method for the Detection of p16 Methylation in the Serum of Colorectal Cancer Patients. Anticancer Research 27(3B):1459-1464 (2007).
Page et al. Detection of HER2 amplification in circulating free DNA in patients with breast cancer. British Journal of Cancer 104:1342-1348 (2011).
Pang et al. Microsatellite alterations of circulating DNA in the plasma of patients with hepatocellular carcinoma. Zhonghua Yi Xue Za Zhi. 86(24):1662-1665 (Jun. 27, 2006).
Papadopoulou et al. Cell-free DNA and RNA in Plasma as a New Molecular Marker for Prostate and Breast Cancer, Ann. NY, Acad. Sci. 1075:235-243 (2006).
PCT/US2009/039565 International Preliminary Report on Patentability and Written Opinion dated Oct. 5, 2010.
PCT/US2009/039565 International Search Report dated Dec. 23, 2009.
PCT/US2013/036845 International Search Report Written Opinion dated Aug. 6, 2013.
Pethig. Dielectrophoresis: Using Inhomogenous AC Electrical Fields to Separate and Manipulate Cells, CRC Critical Reviews in Biotechnology, CRC Press, Boca Raton, FL, US. 16(4):331-348 (Jan. 1, 1996).
Ponomaryova et al. Potentialities of aberrantly methylated circulating DNA for diagnostics and post-treatment follow-up of lung cancer patients. Lung Cancer. 81(3):397-403 (Sep. 2013).
Ramos et al. Ac electrokinetics: a review of forces in microelectrode structures. J Phys. D: Appl. Phys. 31:2338-2353 (1998).
Ren et al. Circulating DNA level is negatively associated with the long-term survival of hepatocellular carcinoma patients. World Journal of Gastroenterology 12(24):3911-3914 (Jun. 28, 2006).
Sai et al. Quantification of Plasma Cell-free DNA in Patients with Gastric Cancer. Anticancer Research 27(4C):2747-2752 (2007).
Sakakura et al. Quantitative Analysis of Tumor-derived Methylated RUNX3 Sequences in the Serum of Gastric Cancer Patients. Anticancer Research 29:2619-2626 (2009).
Salkeni et al. Detection of EGFRvIII mutant DNA in the peripheral blood of brain tumor patients. J. Neurooncol. 115(1):27-35 (Oct. 2013).
Sawabu et al. Serum tumor markers and molecular biological diagnosis in pancreatic cancer. Pancreas 28(3):263-267 (Apr. 2004).
Schwarzenbach. Detection and monitoring of cell-free DNA in blood of patients with colorectal cancer. Ann N Y Acad Sci. 1137:190-196 (Aug. 2008).
Schwarzenbach. Loss of Heterozygosity at Tumor Suppressor Genes Detectable on Fractionated Circulating Cell-Free Tumor DNA as Indicator of Breast Cancer Progression. Clinical Cancer Research 18:5719-5730 (Sep. 25, 2012).
Sharma et al. DNA methylation of circulating DNA: a marker for monitoring efficacy of neoadjuvant chemotherapy in breast cancer patients. Tumour Biol. 33(6):1837-1843 (Dec. 2012).
Shaw et al. Genomic analysis of circulating cell-free DNA infers breast cancer dormancy. Genome Research 22(2):220-231 (Feb. 2012).
Sonnenberg et al. Dielectrophoretic Isolation of DNA and Nonoparticles from Blood. Electrophoresis 33(16):2482-2490 (2012).
Sorenson. Detection of Mutated KRAS2 Sequences as Tumor Markers in Plasma/Serum of Patients with Gastrointestinal Cancer. Clin Cancer Res 6:2129-2137 (2000).
Sosnowski et al. Rapid determination of single base mismatch mutations in DNA hybrids by direct electric field control. Proc. Natl. Acad. Sci. USA 94:1119-1123 (Feb. 1997).
Stephens et al. The dielectrophoresis enrichment of CD34+ cells from peripheral blood stern cell harvests. Bone Marrow Transplant. 18:777-82 (1996).
Stroun et al. Isolation and characterization of DNA from the plasma of cancer patients. Eur J Cancer Clin Oneol 23:707-712 (1987).
Swanson. A fully multiplexed CMOS biochip for DNA analysis. Sensors and Actuators B 64:22-30 (Jun. 2000).
Tamkovich et al. Cell-surface-bound circulating DNA as a prognostic factor in lung cancer. Ann N Y Acad Sci. 1137:214-217 (Aug. 2008).
Tanaka et al. Role of circulating free alu DNA in endometrial cancer. Int J Gynecol Cancer 22(1):82-86 (Jan. 2012).
Tangkijvanich et al. Serum LINE-1 hypomethylation as a potential prognostic marker for hepatocellular carcinoma. Clin Chim Acta. 379(1-2):127-133 (Apr. 2007).
Tani et al. An early detection of recurrence using reverse transcriptase-polymerase chain reaction (RT-PCP) and methylation-specific plymerase chain reaction (MSP) from peripheral blood in patients after gastrectomy. Gan to Kagaku Ryoho 33(12):1720-1722 (Nov. 2006).
Tomita et al. Quantification of Circulating Plasma DNA Fragments as Tumor Markers in Patients with Esophageal Cancer, Anticancer Research 27(4C):2737-2742 (2007).
Toner et al. Blood-on-a-chip. Annual Review of Biomedical Engineering 7:77-103 (2005).
Tong et al. Diagnostic developments involving cell-free (circulating) nucleic acids. Clinica Chimica Acta. 363:187-96 (2006).
Toth et al. Free circulating DNA based colorectal cancer screening from peripheral blood: the possibility of the methylated septin 9 gene marker. Orv. Hetil. 150(21):969-977. (Article in Hungarian) (May 24, 2009).
Trevisiol et al. Prognostic value of circulating KRAS2 gene mutations in colorectal cancer with distant metastases. Int J Biol Markers. 21(4):223-228 (Oct.-Dec. 2006).
Tuukanen et al. Carbon nanotubes as electrodes for dielectrophoresis of DNA. Nano Letters.6:1339-1343 (2006).

(56) References Cited

OTHER PUBLICATIONS

Umetani et al. Increased Integrity of Free Circulating DNA in Sera of Patients with Colorectal or Periampullary Cancer: Direct Quantitative PCR for ALU Repeats. Clinical Chemistry.52(6):1062-1069 (Jun. 2006).
Umetani et al. Prediction of Breast Tumor Progression by Integrity of Free Circulating DNA in Serum. Journal of Clinical Oncology 24(26):4270-4276 (Sep. 10, 2006).
U.S. Appl. No. 14/512,356 Office Action dated Feb. 5, 2015.
U.S. Appl. No. 12/936,147 Office Action dated Apr. 27, 2015.
U.S. Appl. No. 12/936,147 Office Action dated Dec. 11, 2012.
U.S. Appl. No. 12/936,147 Office Action dated Jul. 18, 2013.
U.S. Appl. No. 12/936,147 Office Action dated Oct. 31, 2012.
U.S. Appl. No. 13/864,179 Office Action dated Aug. 15, 2013.
U.S. Appl. No. 14/063,884 Office Action dated Aug. 28, 2014.
U.S. Appl. No. 14/067,841 Office Action dated Mar. 16, 2015.
U.S. Appl. No. 14/194,566 Office Action dated May 15, 2014.
U.S. Appl. No. 14/271,337 Office Action dated Jun. 12, 2014.
U.S. Appl. No. 14/311,037 Office Action dated Sep. 5, 2014.
U.S. Appl. No. 14/477,800 Office Action dated Feb. 2, 2015.
U.S. Appl. No. 14/509,022 Office Action dated Jan. 15, 2015.
U.S. Appl. No. 14/201,715 Office Action dated May 15, 2014.
U.S. Appl. No. 14/201,726 Office Action dated May 16, 2014.
Wallner et al. Methylation of Serum DNA is an Independent Prognostric Marker in Colorectal Cancer, Clinical Cancer Research 12(24):7347-7352 (Dec. 15, 2006).
Washizu et al. Applications of electrostatic stretch-and-positioning of DNA. Industry Applications. IEEE Transactions on Industry Applications 31:447-456 (1995).
Washizu et al. Electrostatic manipulation of DNA in microfabricated structures. Industry Applications. IEEE Transactions on Industry Applications 26:1165-1172 (1990).
Weaver et al. Methylated tumor-specific DNA as a plasma biomarker in patients with glioma. Cancer Invest. 24(1):35-40 (Feb. 2006).
Weiss et al. Circulating tumor DNA to monitor metastatic breast cancer. New England Journal of Medicine. 369(1):93 (Jul. 4, 2013).
Widschwendter et al. CDH1 and CDH13 Methylation in Serum is an Independent Prognostic Marker in Cervical Cancer Patients. Int. J. Cancer 109(2):163-166 (Mar. 20, 2004).
Wu et al. Cell-free DNA: measurement in various carcinomas and establishment of normal reference range. Clin Chim Acta. 321(1-2):77-87 (2002).
Xie et al. Quantification of plasma DNA as a screening tool for lung cancer. Chinese Medical Journal 117(10):1485-1488 (Oct. 2004).
Yoon et al. Comparison of Circulating Plasma DNA Levels between Lung Cancer Patients and Healthy Controls. Journal of Molecular Diagnostics 11(3):182-185 (May 2009).
Zachariah et al. Circulating cell-free DNA as a potential biomarker for minimal and mild endometriosis. Reprod Biomed Online 18(3):407-411 (Mar. 2009).
Zachariah et al. Levels of circulating cell-free nuclear and mitochondrial DNA in benign and malignant ovarian tumors. Obstet. Gynecol. 112(4):843-850 (Oct. 2008).
Zhou et al. Circulating cell-free nucleic acids: promising biomarkers of hepatocellular carcinoma. Semin Oncol. 39(4):440-448 (Aug. 2012).
Ziegler et al. Circulating DNA: a new diagnostic gold mine? Cancer Treat Rev. 28:255-71 (2002).
Zurita et al. Hypermethylated 14-3-3-σ and ESR1 gene promoters in serum as candidate biomarkers for the diagnosis and treatment efficacy of breast cancer metastasis. BMC Cancer 10(217) 9 pgs (May 2010).
Co-pending U.S. Appl. No. 14/925,157, filed Oct. 28, 2015.
Menachery et al. Controlling cell destruction using dielectrophoretic forces. IEE Proc.—Nanobiotechnol. 152(4):145-149 (2005).
PCT/US2013/036845 International Preliminary Report on Patentability and Written Opinion dated Oct. 30, 2014.
U.S. Appl. No. 12/936,147 Office Action dated Aug. 12, 2015.
U.S. Appl. No. 14/477,800 Office Action dated Dec. 15, 2014.
U.S. Appl. No. 14/925,157 Office Action dated Mar. 22, 2016.
Haeberle et al. Centrifugal extraction of plasma from whole blood on a rotating disk. Lab Chip 6(6):776-781 (2006).
U.S. Appl. No. 14/415,546 Office Action dated Apr. 28, 2016.

* cited by examiner

DEVICES FOR SEPARATION OF BIOLOGICAL MATERIALS

CROSS-REFERENCE

This application claims priority to U.S. Provisional Application Ser. No. 61/977,006, filed Apr. 8, 2014, and U.S. Provisional Application Ser. No. 61/977,249, filed Apr. 9, 2014, which is incorporated herein by reference.

BACKGROUND OF THE INVENTION

Separation of nanoscale analytes from other material present in biological samples is an important step in the purification of biological analyte material, including nucleic acids, for later diagnostic or biological characterization. Current techniques are typically bulky, requiring large volumes of sample for operation. There continues to be a need for a robust platform capable of isolating nanoscale analytes from complex biological samples using minimal sample volume without requiring additional purification steps.

SUMMARY OF THE INVENTION

In some instances, the present invention fulfills a need for improved methods of separating nanoscale analytes from complex biological samples utilizing minimal volumes of samples in an efficient manner. In some aspects provided herein, samples are processed and nanoscale analytes isolated in a short period of time. In other aspects, the isolated nanoscale analytes require no further sample preparation or enrichment. In still other aspects, minimal amounts of starting material is used to isolate sufficient nano scale analyte material to a desired level of purity and concentration such that additional analysis and characterization can take place without further processing or purification. In yet other aspects, the methods, devices and compositions disclosure herein are amenable to multiplexed and high-throughput operation. The nanoscale analytes isolated using the methods and devices disclosed herein are elutable and directly transferable and capable of analysis and characterization without further manipulation to be used in other devices and methods employed for diagnostic purposes.

In one aspect, disclosed herein, in some embodiments, are compositions, devices and methods for isolating a nanoscale analyte from a biological sample using a plurality of alternating current (AC) electrodes as disclosed herein. In some embodiments, the AC electrodes are configured to be selectively energized to establish AC electrokinetic high fields. In other embodiments, the AC electrodes are configured to be selectively energized to establish AC electrokinetic low fields. In yet other embodiments, the AC electrodes are configured to be selectively energized to establish AC electrokinetic high field regions and AC electrokinetic low field regions.

In some embodiments, the methods, devices and compositions disclosed herein utilize an array of electrode configurations and designs to improve capture of nanoscale analytes at the surface of the electrodes. In some embodiments, the array of electrodes are configured such that fluid flow around or within the vicinity of the electrodes are disrupted or altered, allowing the localization and/or retention of nanoscale analytes around or within the electrode arrays.

In some embodiments, flow around or within the vicinity of the electrodes is substantially reduced or lessened as compared to conventional electrodes. In yet other embodiments, the reduction of flow is due to the composition of the electrode and/or electrode array. In still other embodiments, the reduction of flow is due to the physical design or configuration of the electrode and/or array. In other embodiments, the reduction of flow is due to a combination of the composition of the electrode and/or electrode array as well as a physical change in the design or configuration of the electrode and/or electrode array. In still other embodiments, the reduction of flow is due to compositions and/or physical configurations directly outside of the physical boundary of the electrode array. In yet other embodiments, the reduction of flow is due to a combination of compositions and/or alterations of physical designs and configurations of the electrode and/or electrode array in combination with compositions and/or physical configurations outside of the physical boundary of the electrode and/or electrode array.

In some embodiments, the electrodes are capable of sourcing greater than 50 mA of current. In some embodiments, the electrodes are capable of sourcing greater than 100 mA of current. In some embodiments, the electrodes are capable of sourcing greater than 250 mA of current. In some embodiments, the electrodes are capable of sourcing greater than 500 mA of current.

In some embodiments, disclosed herein is a device for isolating a nanoscale analyte in a sample, the device comprising: (1) a housing; (2) a heater and/or a reservoir comprising a protein degradation agent; and (3) a plurality of alternating current (AC) electrodes as disclosed herein within the housing, the AC electrodes configured to be selectively energized to establish AC electrokinetic high field and AC electrokinetic low field regions, wherein the electrodes comprise conductive material configured on or around the electrodes which reduces, disrupts or alters fluid flow around or within the vicinity of the electrodes as compared to fluid flow in regions between or substantially beyond the electrode vicinity. In some embodiments, the conductive material is substantially absent from the center of the individual electrodes in the array. In some embodiments, the conductive material is present at the edges of the individual electrodes in the electrode array. In some embodiments, the conductive material is in the shape of an open disk. In some embodiments, the electrode is configured in a hollow ring shape. In some embodiments, the electrode is configured in a hollow tube shape. In some embodiments, the array of electrodes comprises non-conductive material. In some embodiments, the non-conductive material surrounds the conductive material within the electrodes and serves as a physical barrier to the conductive material. In some embodiments, the conductive material within the electrodes fills depressions in the non-conductive material of the array. In some embodiments, the array of electrodes is configured in three-dimensions. In some embodiments, the conductive material within the electrodes is configured at an angle. In some embodiments, the conductive material within the electrodes is configured into a hollow triangular tube. In some embodiments, the conductive material within the electrodes is configured into angles between neighboring planar electrode surfaces of less than about 180 degrees. In some embodiments, the conductive material configured into angles between neighboring planar electrode surfaces of equal to or less than 180 degrees. In some embodiments, the conductive material within the electrodes is configured into angles of more than about or equal to 60 degrees. In some embodiments, the conductive material configured into angles between neighboring planar electrode surfaces of equal to or more than 60 degrees. In some embodiments, the conductive material within the electrodes is configured into a depressed concave shape. In some embodiments, the three-dimensional configuration of the conductive material increases the total surface area of the conductive material within the electrodes. In some embodiments, the individual electrodes are about 40 μm to about 100 μm in diameter. In some embodiments, the electrodes are in a non-circular configuration. In some embodiments, the angle of orientation between non-circular configurations is between about 25 and 90 degrees. In some embodiments, the non-circular configuration comprises a wavy line configuration, wherein the configuration comprises a repeating unit comprising the shape of a pair of dots connected by linker, wherein the linker tapers inward toward the midpoint between the pair of dots, wherein the diameters of the dots are the widest points along the length of the repeating unit, wherein the edge to edge distance between a parallel set of repeating units is equidistant, or roughly equidistant.

In some embodiments, the (AC) electrodes in the array comprise one or more floating electrodes. The floating electrodes are not energized to establish AC electrokinetic regions. In some embodiments, a floating electrode surrounds an AC electrode. In further embodiments, the floating electrodes in the array induce an electric field with a higher gradient than an electric field induced by non-floating electrodes in the array.

In another aspect, disclosed herein, in some embodiments, is a method for isolating a nanoscale analyte in a sample, the method comprising: a. applying the sample to a device, the device comprising an array of electrodes capable of establishing an AC electrokinetic field region wherein the electrodes comprise conductive material configured on or around the electrodes which reduces, disrupts or alters fluid flow around or within the vicinity of the electrodes as compared to fluid flow in regions between or substantially beyond the electrode vicinity; b. producing at least one AC electrokinetic field region, wherein the at least one AC electrokinetic field region is a dielectrophoretic high field region; and c. isolating the nanoscale analyte in the dielectrophoretic high field region. In some embodiments, the conductive material is substantially absent from the center of the individual electrodes in the array. In some embodiments, the conductive material is present at the edges of the individual electrodes in the electrode array. In some embodiments, the conductive material is in the shape of an open disk. In some embodiments, the electrode is configured in a hollow ring shape. In some embodiments, the electrode is configured in a hollow tube shape. In some embodiments, a reduction in conductive material within the electrodes results in reduced fluid flow in and around the electrode surface, leading to an increase in nanoscale analyte capture on the surface of the electrode. In some embodiments, the increase in nanoscale analyte capture is at least 10%, at least 20%, at least 30%, at least 40%, at least 50%, at least 60%, at least 70%, at least 80%, at least 90% or at least 100% or more nanoscale analyte captured than if using conventional electrode configuration or designs without a reduction in conductive material within the electrodes. In some embodiments, the array of electrodes comprises non-conductive material. In some embodiments, the non-conductive material surrounds the conductive material within the electrodes and serves as a physical barrier to the conductive material. In some embodiments, the conductive material within the electrodes fills depressions in the non-conductive material of the array. In some embodiments, the array of electrodes is configured in three-dimensions. In some embodiments, the conductive material within the electrodes is configured at an angle. In some embodiments, the conductive material within the electrodes is configured into a hollow triangular tube. In some embodiments, the conductive material within the electrodes is configured into angles between neighboring planar electrode surfaces of less than about 180 degrees. In some embodiments, the conductive material configured into angles between neighboring planar electrode surfaces of equal to or less than 180 degrees. In some embodiments, the conductive material within the electrodes is configured into angles of more than about 60 degrees. In some embodiments, the conductive material configured into angles between neighboring planar electrode surfaces of equal to or more than 60 degrees. In some embodiments, the conductive material within the electrodes is configured into a depressed concave shape. In some embodiments, the three-dimensional configuration of the conductive material increases the total surface area of the conductive material within the electrodes. In some embodiments, the individual electrodes are about 40 μm to about 100 μm in diameter. In some embodiments, the electrodes are in a non-circular configuration. In some embodiments, the angle of orientation between non-circular configurations is between about 25 and 90 degrees. In some embodiments, the non-circular configuration comprises a wavy line configuration, wherein the configuration comprises a repeating unit comprising the shape of a pair of dots connected by linker, wherein the linker tapers inward toward the midpoint between the pair of dots, wherein the diameters of the dots are the widest points along the length of the repeating unit, wherein the edge to edge distance between a parallel set of repeating units is equidistant, or roughly equidistant. In some embodiments, the AC electrokinetic field is produced using an alternating current having a voltage of 1 volt to 40 volts peak-peak, and/or a frequency of 5 Hz to 5,000,000 Hz and duty cycles from 5% to 50%. In some embodiments, the sample comprises a fluid. In some embodiments, the conductivity of the fluid is less than or equal to 300 mS/m. In some embodiments, the conductivity of the fluid is greater than or equal to 300 mS/m. In some embodiments, the electrodes are selectively energized to provide the first dielectrophoretic high field region and subsequently or continuously selectively energized to provide the second dielectrophoretic high field region. In some embodiments, the nanoscale analyte is a nucleic acid. In some embodiments, the isolated nucleic acid comprises less than about 10% non-nucleic acid cellular material or cellular protein by mass. In some embodiments, the fluid comprises cells. In some embodiments, the method further comprises lysing cells on the array. In some embodiments, the cells are lysed using a direct current, a chemical lysing agent, an enzymatic lysing agent, heat, pressure, sonic energy, or a combination thereof. In some embodiments, the method further comprises degradation of residual proteins after cell lysis. In some embodiments, the cells are lysed using a direct current with a voltage of 1-500 volts, a pulse frequency of 0.2 to 200 Hz with duty cycles from 10-50%, and a pulse duration of 0.01 to 10 seconds applied at least once. In some embodiments, the array of electrodes is spin-coated with a hydrogel having a thickness between about 0.1 microns and 1 micron. In some embodiments, the hydrogel is deposited onto the array of electrodes by chemical vapor deposition or surface-initiated polymerization. In yet other embodiments, the hydrogel is deposited onto the array of electrodes by dip coating, spray coating, inkjet printing, Langmuir-Blodgett coating, or combinations thereof. In still other embodiments, the hydrogel is deposited onto the array of electrodes by grafting of polymers by end-functionalized groups or by self-assembly from solution thru solvent selectivity.

In some embodiments, the hydrogel comprises two or more layers of a synthetic polymer. In some embodiments, the hydrogel has a viscosity between about 0.5 cP to about 5 cP prior to spin-coating or deposition onto the array of electrodes. In some embodiments, the hydrogel has a conductivity between about 0.1 S/m to about 1.0 S/m. In some embodiments, the method is completed in less than 10 minutes. In some embodiments, the array of electrodes comprises a passivation layer with a relative electrical permittivity from about 2.0 to about 4.0.

In some embodiments, the electrodes comprise one or more floating electrodes. The floating electrodes are not energized to establish AC electrokinetic regions. A floating electrode surrounds an energized electrode. In some embodiments, the floating electrodes in the array induce an electric field with a higher gradient than an electric field induced by non-floating electrodes in the array.

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
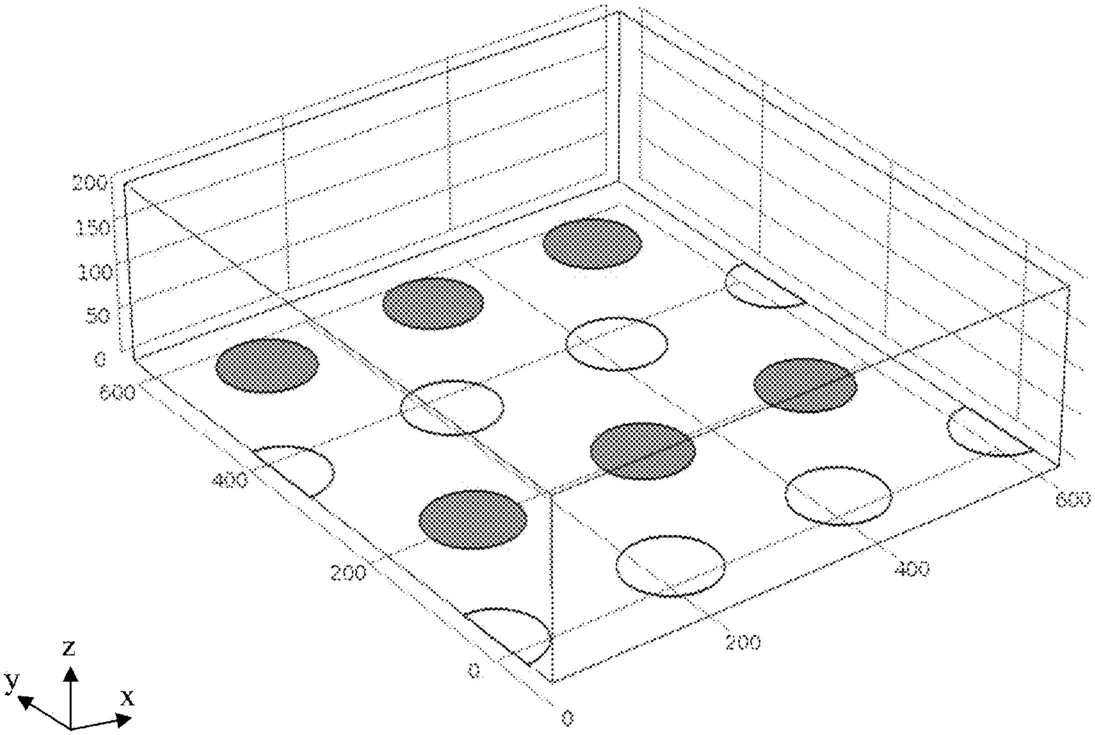
FIG. 1 exemplifies a standard electrode configuration in the shape of a hollow disk. The electrode comprises conductive material around the edges of the electrode. The color filled electrodes represent the anodes and the non-color filled electrodes represent the cathodes.

Described herein are methods, devices and systems suitable for isolating or separating nanoscale analytes from complex samples. In specific embodiments, provided herein are methods, devices and systems for isolating or separating a nanoscale analyte from a sample comprising other particulate material. In some aspects, the methods, devices and systems may allow for rapid separation of particles and nanoscale analytes in a sample. In other aspects, the methods, devices and systems may allow for rapid isolation of nanoscale analytes from particles in a sample. In various aspects, the methods, devices and systems may allow for a rapid procedure that requires a minimal amount of material and/or results in a highly purified nanoscale analyte isolated from complex fluids such as blood or environmental samples.

Provided in certain embodiments herein are methods, devices and systems for isolating or separating nanoscale analytes from a sample, the methods, devices, and systems comprising applying the fluid to a device comprising an array of electrodes as disclosed herein and being capable of generating AC electrokinetic forces (e.g., when the array of electrodes are energized). AC Electrokinetics (ACE) capture is a functional relationship between the dielectrophoretic force ($F_{DEP}$) and the flow force ($F_{FLOW}$) derived from the combination of AC electrothermal (ACET) and AC electroosmostic (ACEO) flows. In some embodiments, the dielectrophoretic field generated is a component of AC electrokinetic force effects. In other embodiments, the component of AC electrokinetic force effects is AC electroosmosis or AC electrothermal effects. In some embodiments the AC electrokinetic force, including dielectrophoretic fields, comprises high-field regions (positive DEP, i.e. area where there is a strong concentration of electric field lines due to a non-uniform electric field) and/or low-field regions (negative DEP, i.e. area where there is a weak concentration of electric field lines due to a non-uniform electric field).

In specific instances, the nanoscale analytes (e.g., nucleic acid) are isolated (e.g., isolated or separated from particulate material) in a field region (e.g., a high field region) of a dielectrophoretic field. In some embodiments, the method, device, or system includes isolating and concentrating nanoscale analytes in a high field DEP region. In some embodiments, the method, device, or system includes isolating and concentrating nanoscale analytes in a low field DEP region The method also optionally includes devices and/or systems capable of performing one or more of the following steps: washing or otherwise removing residual (e.g., cellular or proteinaceous) material from the nanoscale analyte (e.g., rinsing the array with water or buffer while the nanoscale analyte is concentrated and maintained within a high field DEP region of the array), degrading residual proteins (e.g., degradation occurring according to any suitable mechanism, such as with heat, a protease, or a chemical), flushing degraded proteins from the nanoscale analyte, and collecting the nanoscale analyte. In some embodiments, the result of the methods, operation of the devices, and operation of the systems described herein is an isolated nanoscale analyte, optionally of suitable quantity and purity for further analysis or characterization in, for example, enzymatic assays (e.g. PCR assays).

In some embodiments, the methods, devices and compositions disclosed herein utilize electrode configurations and designs to improve separation and capture of the nanoscale analytes from particulate material. In some embodiments, the electrode arrays are configured such that fluid flow around or within the vicinity of the electrodes are disrupted or altered, allowing the localization and/or retention of nanoscale analytes around or within the electrode arrays. In other embodiments, the improvement in nanoscale analyte capture is at least 10%, at least 20%, at least 30%, at least 40%, at least 50%, at least 60%, at least 70%, at least 80%, at least 90% or at least 100% or more nanoscale analyte captured than if using conventional electrode configuration or designs, which do not have a reduction in conductive material within the electrodes.

In some embodiments, the array of electrodes as disclosed herein is spin-coated with a hydrogel having a thickness between about 0.1 microns and 1 micron. In some embodiments, the hydrogel is deposited onto the array of electrodes by chemical vapor deposition or surface-initiated polymerization. In yet other embodiments, the hydrogel is deposited onto the array of electrodes by dip coating, spray coating, inkjet printing, Langmuir-Blodgett coating, or combinations thereof. In still other embodiments, the hydrogel is deposited onto the array of electrodes by grafting of polymers by end-functionalized groups or by self-assembly from solution thru solvent selectivity. In some embodiments, the hydrogel comprises two or more layers of a synthetic polymer. In some embodiments, the hydrogel has a viscosity between about 0.5 cP to about 5 cP prior to spin-coating or deposition onto the array of electrodes. In some embodiments, the hydrogel has a conductivity between about 0.1 S/m to about 1.0 S/m.

In some embodiments, the isolated nanoscale analyte comprises less than about 10% non-nanoscale analyte by mass. In some embodiments, the method is completed in less than 10 minutes.

In some embodiments, the method further comprises degrading residual proteins on the array. In some embodiments, the residual proteins are degraded by one or more of a chemical degradant or an enzymatic degradant. In some embodiments, the residual proteins are degraded by Proteinase K.

In some embodiments, the nanoscale analyte is a nucleic acid. In other embodiments, the nucleic acid is further amplified by polymerase chain reaction. In some embodiments, the nucleic acid comprises DNA, RNA, or any combination thereof. In some embodiments, the isolated nucleic acid comprises less than about 80%, less than about 70%, less than about 60%, less than about 50%, less than about 40%, less than about 30%, less than about 20%, less than about 10%, less than about 5%, or less than about 2% non-nucleic acid cellular material and/or protein by mass. In some embodiments, the isolated nucleic acid comprises greater than about 99%, greater than about 98%, greater than about 95%, greater than about 90%, greater than about 80%, greater than about 70%, greater than about 60%, greater than about 50%, greater than about 40%, greater than about 30%, greater than about 20%, or greater than about 10% nucleic acid by mass. In some embodiments, the method is completed in less than about one hour. In some embodiments, centrifugation is not used. In some embodiments, the residual proteins are degraded by one or more of chemical degradation and enzymatic degradation. In some embodiments, the residual proteins are degraded by Proteinase K. In some embodiments, the residual proteins are degraded by an enzyme, the method further comprising inactivating the enzyme following degradation of the proteins. In some embodiments, the enzyme is inactivated by heat (e.g., 50 to 95° C. for 5-15 minutes). In some embodiments, the residual material and the degraded proteins are flushed in separate or concurrent steps. In some embodiments, the isolated nanoscale analyte is collected by (i) turning off the second AC electrokinetic field region; and (ii) eluting the nanoscale analyte from the array in an eluant. In some embodiments, a nanoscale analyte is isolated in a form suitable for sequencing. In some embodiments, the nanoscale analyte is isolated in a fragmented form suitable for shotgun-sequencing.

In some embodiments, the nucleic acid is sequenced by Sanger sequencing, pyrosequencing, ion semiconductor sequencing, polony sequencing, sequencing by ligation, DNA nanoball sequencing, sequencing by ligation, or single molecule sequencing. In some embodiments, the method further comprises performing a reaction on the DNA (e.g., fragmentation, restriction digestion, ligation) that is isolated and eluted from the devices disclosed herein. In some embodiments, the reaction occurs on or near the array or in the device. In some embodiments, the fluid or biological sample comprises no more than 10,000 cells.

In some embodiments, the sample is a biological sample and has a low conductivity or a high conductivity. In some embodiments, the sample comprises a bodily fluid, blood, serum, plasma, urine, saliva, a food, a beverage, a growth medium, an environmental sample, a liquid, water, clonal cells, or a combination thereof. In some embodiments, the cells comprise clonal cells, pathogen cells, bacteria cells, viruses, plant cells, animal cells, insect cells, and/or combinations thereof.

In some embodiments, the devices and methods disclosed herein further comprises using at least one of an elution tube, a chamber and a reservoir to perform amplification of isolated nucleic acids as the nanoscale analyte. In some embodiments, amplification of the isolated and eluted nucleic acid is polymerase chain reaction (PCR)-based. In some embodiments, amplification of the nucleic acid is performed in a serpentine microchannel comprising a plurality of temperature zones. In some embodiments, amplification is performed in aqueous droplets entrapped in immiscible fluids (i.e., digital PCR). In some embodiments, the thermocycling comprises convection. In some embodiments, the device comprises a surface contacting or proximal to the electrodes, wherein the surface is functionalized with biological ligands that are capable of selectively capturing biomolecules. In some embodiments, the surface selectively captures biomolecules by: a. nucleic acid hybridization; b. antibody—antigen interactions; c. biotin—avidin interactions; d. ionic or electrostatic interactions; or e. any combination thereof. In some embodiments, the surface is functionalized to minimize and/or inhibit non-specific binding interactions by: a. polymers (e.g., polyethylene glycol PEG); b. ionic or electrostatic interactions; c. surfactants; or d. any combination thereof. In some embodiments, the device comprises a plurality of microelectrode devices oriented (a) flat side by side, (b) facing vertically, or (c) facing horizontally. In some embodiments, the device comprises a module capable of performing Sanger sequencing. In some embodiments, the module capable of performing Sanger sequencing comprises a module capable of capillary electrophoresis, a module capable of multi-color fluorescence detection, or a combination thereof.

In some instances, it is advantageous that the methods described herein are performed in a short amount of time, the devices are operated in a short amount of time, and the systems are operated in a short amount of time. In some embodiments, the period of time is short with reference to the "procedure time" measured from the time between adding the fluid to the device and obtaining isolated nanoscale analyte. In some embodiments, the procedure time is less than 3 hours, less than 2 hours, less than 1 hour, less than 30 minutes, less than 20 minutes, less than 10 minutes, or less than 5 minutes.

In another aspect, the period of time is short with reference to the "hands-on time" measured as the cumulative amount of time that a person must attend to the procedure from the time between adding the fluid to the device and obtaining isolated nanoscale analyte. In some embodiments, the hands-on time is less than 20 minutes, less than 10 minutes, less than 5 minute, less than 1 minute, or less than 30 seconds.

In some instances, it is advantageous that the devices described herein comprise a single vessel, the systems described herein comprise a device comprising a single vessel and the methods described herein can be performed in a single vessel, e.g., in a dielectrophoretic device as described herein. In some aspects, such a single-vessel embodiment minimizes the number of fluid handling steps and/or is performed in a short amount of time. In some instances, the present methods, devices and systems are contrasted with methods, devices and systems that use one or more centrifugation steps and/or medium exchanges. In some instances, centrifugation increases the amount of hands-on time required to isolate nanoscale analytes. In another aspect, the single-vessel procedure or device isolates nanoscale analytes using a minimal amount of consumable reagents.

Devices and Systems

In some embodiments, described herein are devices for isolating, purifying and collecting a nanoscale analyte from a sample. In one aspect, described herein are devices for isolating, purifying and collecting or eluting a nanoscale from a complex sample other particulate material, including cells and the like. In other aspects, the devices disclosed herein are capable of isolating, purifying, collecting and/or eluting nanoscale analytes from a sample comprising cellular or protein material. In yet other aspects, the devices disclosed herein are capable of isolating, purifying, collecting and/or eluting nanoscale analytes from samples comprising a complex mixture of organic and inorganic materials. In some aspects, the devices disclosed herein are capable of isolating, purifying, collecting and/or eluting nanoscale analytes from samples comprising organic materials. In yet other aspects, the devices disclosed herein are capable of isolating, purifying, collecting and/or eluting nanoscale analytes from samples comprising inorganic materials.

In some embodiments, disclosed herein is a device for isolating a nanoscale analyte in a sample, the device comprising: a. a housing; b. a heater and/or a reservoir comprising a protein degradation agent; and c. a plurality of alternating current (AC) electrodes as disclosed herein within the housing, the AC electrodes configured to be selectively energized to establish AC electrokinetic high field and AC electrokinetic low field regions, wherein the electrodes comprise conductive material configured on or around the electrodes which reduces, disrupts or alters fluid flow around or within the vicinity of the electrodes as compared to fluid flow in regions between or substantially beyond the electrode vicinity. In some embodiments, the conductive material is substantially absent from the center of the individual electrodes in the array. In some embodiments, the conductive material is present at the edges of the individual electrodes in the electrode array.

In some embodiments, an AC electrokinetic field is generated to collect, separate or isolate nanoscale analytes. In some embodiments, the nanoscale analytes are biomolecules, such as nucleic acids. In some embodiments, the AC electrokinetic field is a dielectrophoretic field. Accordingly, in some embodiments dielectrophoresis (DEP) is utilized in various steps of the methods and devices described herein.

Accordingly provided herein are systems and devices comprising a plurality of alternating current (AC) electrodes as disclosed herein, the AC electrodes configured to be selectively energized to establish a dielectrophoretic (DEP) field region. In some aspects, the AC electrodes may be configured to be selectively energized to establish multiple dielectrophoretic (DEP) field regions, including dielectrophoretic (DEP) high field and dielectrophoretic (DEP) low field regions. In some instances, AC electrokinetic effects provide for concentration of larger particulate material in low field regions and/or concentration (or collection or isolation) of nanoscale analytes (e.g., macromolecules, such as nucleic acid) in high field regions of the DEP field. For example, further description of the electrodes and the concentration of cells in DEP fields may be found in PCT patent publication WO 2009/146143 A2, which is incorporated herein for such disclosure.

In specific embodiments, DEP is used to concentrate nanoscale analytes and larger particulate matter either concurrently or at different times. In certain embodiments, methods and devices described herein are capable of energizing the array of electrodes as disclosed herein so as to produce at least one DEP field. In other embodiments, the methods and devices described here further comprise energizing the array of electrodes so as to produce a first, second, and any further optional DEP fields. In some embodiments, the devices and systems described herein are capable of being energized so as to produce a first, second, and any further optional DEP fields.

DEP is a phenomenon in which a force is exerted on a dielectric particle when it is subjected to a non-uniform electric field. Depending on the step of the methods described herein, aspects of the devices and systems described herein, and the like, the dielectric particle in various embodiments herein is a biological nanoscale analyte, such as a nucleic acid molecule. Different steps of the methods described herein or aspects of the devices or systems described herein may be utilized to isolate and separate different components, such as intact cells or other particular material; further, different field regions of the DEP field may be used in different steps of the methods or aspects of the devices and systems described herein. The dielectrophoretic force generated in the device does not require the particle to be charged. In some instances, the strength of the force depends on the medium and the specific particles' electrical properties, on the particles' shape and size, as well as on the frequency of the electric field. In some instances, fields of a particular frequency selectively manipulate particles. In certain aspects described herein, these processes allow for the separation of nanoscale analytes, including nucleic acid molecules, from other components, such as cells and proteinaceous material.

Also provided herein are systems and devices comprising a plurality of direct current (DC) electrodes. In some embodiments, the plurality of DC electrodes comprises at least two rectangular electrodes, spread throughout the array. In some embodiments, the electrodes are located at the edges of the array. In some embodiments, DC electrodes are interspersed between AC electrodes.

In some embodiments, disclosed herein is a device for isolating a nanoscale analyte in a sample, the device comprising: (1) a housing; (2) a plurality of alternating current (AC) electrodes as disclosed herein within the housing, the AC electrodes configured to be selectively energized to establish AC electrokinetic high field and AC electrokinetic low field regions, whereby AC electrokinetic effects provide for concentration of the nanoscale analytes cells in an electrokinetic field region of the device. In some embodiments, the plurality of electrodes is configured to be selectively energized to establish a dielectrophoretic high field and dielectrophoretic low field regions.

In some embodiments, disclosed herein is a device comprising: (1) a plurality of alternating current (AC) electrodes as disclosed herein, the AC electrodes configured to be selectively energized to establish AC electrokinetic high field and AC electrokinetic low field regions; and (2) a module capable of performing enzymatic reactions, such as polymerase chain reaction (PCR) or other enzymatic reaction. In some embodiments, the plurality of electrodes is configured to be selectively energized to establish a dielectrophoretic high field and dielectrophoretic low field regions. In some embodiments, the device is capable of isolating a nanoscale analyte from a sample, collecting or eluting the nanoscale analyte and further performing an enzymatic reaction on the nanoscale analyte. In some embodiments, the enzymatic reaction is performed in the same chamber as the isolation and elution stages. In other embodiments, the enzymatic reaction is performed in another chamber than the isolation and elution stages. In still other embodiments, a nanoscale analyte is isolated and the enzymatic reaction is performed in multiple chambers.

In some embodiments, the device further comprises at least one of an elution tube, a chamber and a reservoir to perform an enzymatic reaction. In some embodiments, the enzymatic reaction is performed in a serpentine microchannel comprising a plurality of temperature zones. In some embodiments, the enzymatic reaction is performed in aqueous droplets entrapped in immiscible fluids (e.g., digital PCR). In some embodiments, the thermal reaction comprises convection. In some embodiments, the device comprises a surface contacting or proximal to the electrodes, wherein the surface is functionalized with biological ligands that are capable of selectively capturing biomolecules.

In one aspect, described herein is a device comprising electrodes, wherein the electrodes are placed into separate chambers and DEP fields are created within an inner chamber by passage through pore structures. The exemplary device includes a plurality of electrodes and electrode-containing chambers within a housing. A controller of the device independently controls the electrodes, as described further in PCT patent publication WO 2009/146143 A2, which is incorporated herein for such disclosure.

In some embodiments, chambered devices are created with a variety of pore and/or hole structures (nanoscale, microscale and even macroscale) and contain membranes, gels or filtering materials which control, confine or prevent cells, nanoparticles or other entities from diffusing or being transported into the inner chambers while the AC/DC electric fields, solute molecules, buffer and other small molecules can pass through the chambers.

Such devices include, but are not limited to, multiplexed electrode and chambered devices, devices that allow reconfigurable electric field patterns to be created, devices that combine DC electrophoretic and fluidic processes; sample preparation devices, sample preparation, enzymatic manipulation of isolated nucleic acid molecules and diagnostic devices that include subsequent detection and analysis, lab-on-chip devices, point-of-care and other clinical diagnostic systems or versions.

In some embodiments, a planar electrode array device comprises a housing through which a sample fluid flows. In some embodiments, fluid flows from an inlet end to an outlet end, optionally comprising a lateral analyte outlet. The exemplary device includes multiple AC electrodes. In some embodiments, the sample consists of a combination of micron-sized entities or cells, larger nanoscale analytes and smaller nanoscale analytes or biomolecules.

In some embodiments, the smaller nanoscale analytes are proteins, smaller DNA, RNA and cellular fragments. In some embodiments, the planar electrode array device is a 60×20 electrode array that is optionally sectioned into three 20×20 arrays that can be separately controlled but operated simultaneously. The optional auxiliary DC electrodes can be switched on to positive charge, while the optional DC electrodes are switched on to negative charge for electrophoretic purposes. In some instances, each of the controlled AC and DC systems is used in both a continuous and/or pulsed manner (e.g., each can be pulsed on and off at relatively short time intervals) in various embodiments. The optional planar electrode arrays along the sides of the sample flow are optionally used to generate DC electrophoretic forces as well as AC DEP. Additionally, microelectrophoretic separation processes may be optionally carried out, in combination with nanopore or hydrogel layers on the electrode array, using planar electrodes in the array and/or auxiliary electrodes in the x-y-z dimensions.

In various embodiments these methods, devices and systems are operated in the AC frequency range of from 1,000 Hz to 100 MHz, at voltages which could range from approximately 1 volt to 2000 volts pk-pk; at DC voltages from 1 volt to 1000 volts, at flow rates of from 10 microliters per minute to 10 milliliter per minute, and in temperature ranges from 1° C. to 120° C. In some embodiments, the methods, devices and systems are operated in AC frequency ranges of from about 3 to about 15 kHz. In some embodiments, the methods, devices, and systems are operated at voltages of from 5-25 volts pk-pk. In some embodiments, the methods, devices and systems are operated at voltages of from about 1 to about 50 volts/cm. In some embodiments, the methods, devices and systems are operated at DC voltages of from about 1 to about 5 volts. In some embodiments, the methods, devices and systems are operated at a flow rate of from about 10 microliters to about 500 microliters per minute. In some embodiments, the methods, devices and systems are operated in temperature ranges of from about 20° C. to about 60° C.

In some embodiments, the methods, devices and systems are operated in AC frequency ranges of from 1,000 Hz to 10 MHz. In some embodiments, the methods, devices and systems are operated in AC frequency ranges of from 1,000 Hz to 1 MHz. In some embodiments, the methods, devices and systems are operated in AC frequency ranges of from 1,000 Hz to 100 kHz. In some embodiments, the methods, devices and systems are operated in AC frequency ranges of from 1,000 Hz to 10 kHz. In some embodiments, the methods, devices and systems are operated in AC frequency ranges of from 10 kHz to 100 kHz. In some embodiments, the methods, devices and systems are operated in AC frequency ranges of from 100 kHz to 1 MHz.

In some embodiments, the methods, devices and systems are operated at voltages from approximately 1 volt to 1500 volts pk-pk. In some embodiments, the methods, devices and systems are operated at voltages from approximately 1 volt to 1500 volts pk-pk. In some embodiments, the methods, devices and systems are operated at voltages from approximately 1 volt to 1000 volts pk-pk. In some embodiments, the methods, devices and systems are operated at voltages from approximately 1 volt to 500 volts pk-pk. In some embodiments, the methods, devices and systems are operated at voltages from approximately 1 volt to 250 volts pk-pk. In some embodiments, the methods, devices and systems are operated at voltages from approximately 1 volt to 100 volts pk-pk. In some embodiments, the methods, devices and systems are operated at voltages from approximately 1 volt to 50 volts pk-pk.

In some embodiments, the methods, devices and systems are operated at DC voltages from 1 volt to 1000 volts. In some embodiments, the methods, devices and systems are operated at DC voltages from 1 volt to 500 volts. In some embodiments, the methods, devices and systems are operated at DC voltages from 1 volt to 250 volts. In some embodiments, the methods, devices and systems are operated at DC voltages from 1 volt to 100 volts. In some embodiments, the methods, devices and systems are operated at DC voltages from 1 volt to 50 volts.

In some embodiments, the AC electrokinetic field is produced using an alternating current having a voltage of 1 volt to 40 volts peak-peak, and/or a frequency of 5 Hz to 5,000,000 Hz and duty cycles from 5% to 50%.

In some embodiments, the methods, devices, and systems are operated at flow rates of from 10 microliters per minute to 1 ml per minute. In some embodiments, the methods, devices, and systems are operated at flow rates of from 10 microliters per minute to 500 microliters per minute. In some embodiments, the methods, devices, and systems are operated at flow rates of from 10 microliters per minute to 250 microliters per minute. In some embodiments, the methods, devices, and systems are operated at flow rates of from 10 microliters per minute to 100 microliters per minute.

In some embodiments, the methods, devices, and systems are operated in temperature ranges from 1° C. to 100° C. In some embodiments, the methods, devices, and systems are operated in temperature ranges from 20° C. to 95° C. In some embodiments, the methods, devices, and systems are operated in temperature ranges from 25° C. to 100° C. In some embodiments, the methods, devices, and systems are operated at room temperature.

In some embodiments, the controller independently controls each of the electrodes. In some embodiments, the controller is externally connected to the device such as by a socket and plug connection, or is integrated with the device housing.

In some embodiments, the device comprises a housing and a heater or thermal source and/or a reservoir comprising a protein degradation agent. In some embodiments, the heater or thermal source is capable of increasing the temperature of the fluid to a desired temperature (e.g., to a temperature suitable for degrading proteins, about 30° C., 40° C., 50° C., 60° C., 70° C., or the like). In some embodiments, the heater or thermal source is suitable for operation as a PCR thermocycler. In other embodiments, the heater or thermal source is used to maintain a constant temperature (isothermal conditions). In some embodiments, the protein degradation agent is a protease. In other embodiments, the protein degradation agent is Proteinase K and the heater or thermal source is used to inactivate the protein degradation agent.

In some embodiments, the device comprises a second reservoir comprising an eluant. The eluant is any fluid suitable for eluting the isolated nanoscale analyte from the device. In some instances the eluant is water or a buffer. In some instances, the eluant comprises reagents required for a DNA sequencing method.

In some embodiments, a system or device described herein is capable of maintaining a constant temperature. In some embodiments, a system or device described herein is capable of cooling the array or chamber. In some embodiments, a system or device described herein is capable of heating the array or chamber. In some embodiments, a system or device described herein comprises a thermocycler. In some embodiments, the devices disclosed herein comprise a localized temperature control element. In some embodiments, the devices disclosed herein are capable of both sensing and controlling temperature.

In some embodiments, the devices further comprise heating or thermal elements. In some embodiments, a heating or thermal element is localized underneath an electrode. In some embodiments, the heating or thermal elements comprise a metal. In some embodiments, the heating or thermal elements comprise tantalum, aluminum, tungsten, or a combination thereof. Generally, the temperature achieved by a heating or thermal element is proportional to the current running through it. In some embodiments, the devices disclosed herein comprise localized cooling elements. In some embodiments, heat resistant elements are placed directly under the exposed electrode array. In some embodiments, the devices disclosed herein are capable of achieving and maintaining a temperature between about 20° C. and about 120° C. In some embodiments, the devices disclosed herein are capable of achieving and maintaining a temperature between about 30° C. and about 100° C. In other embodiments, the devices disclosed herein are capable of achieving and maintaining a temperature between about 20° C. and about 95° C. In some embodiments, the devices disclosed herein are capable of achieving and maintaining a temperature between about 25° C. and about 90° C., between about 25° C. and about 85° C., between about 25° C. and about 75° C., between about 25° C. and about 65° C. or between about 25° C. and about 55° C. In some embodiments, the devices disclosed herein are capable of achieving and maintaining a temperature of about 20° C., about 30° C., about 40° C., about 50° C., about 60° C., about 70° C., about 80° C., about 90° C., about 100° C., about 110° C. or about 120° C.

Electrodes

In some embodiments, the methods, devices and compositions disclosed herein utilize electrode configurations and designs to improve separation and capture of the nanoscale analytes from particulate material. In some embodiments, the electrode arrays are configured such that fluid flow around or within the vicinity of the electrodes are disrupted or altered, allowing the localization and/or retention of nanoscale analytes around or within the electrode arrays. In other embodiments, the improvement in nanoscale analyte capture is at least 10%, at least 20%, at least 30%, at least 40%, at least 50%, at least 60%, at least 70%, at least 80%, at least 90% or at least 100% or more nanoscale analyte captured than if using conventional electrode configuration or designs.

In some embodiments, the conductive material is in the shape of an open disk. In some embodiments, the electrode is configured in a hollow ring shape. In some embodiments, the electrode is configured in a hollow tube shape. In some embodiments, the array of electrodes as disclosed herein comprises non-conductive material. In some embodiments, the non-conductive material surrounds the conductive material within the electrodes and serves as a physical barrier to the conductive material. In some embodiments, the conductive material within the electrodes fills depressions in the non-conductive material of the array. In some embodiments, the array of electrodes as disclosed herein is configured in three-dimensions.

In one embodiment, the array of electrodes as disclosed herein comprises conductive material in only a fraction of the electrode array. In some embodiments, the conductive material is only present in less than about 10% of the electrode array. In some embodiments, the conductive material is only present in about 10% of the electrode array. In other embodiments, the conductive material is only present in about 20% of the electrode array. In still other embodiments, the conductive material is only present in about 30% of the electrode array. In yet other embodiments, the conductive material is only present in about 40% of the electrode array. In still other embodiments, the conductive material is only present in about 50% of the electrode array. In some embodiments, the conductive material is only present in about 60% of the electrode array. In one embodiment, the conductive material is only present in about 70% of the electrode array. In still other embodiments, the conductive material is only present in about 80% of the electrode array. In yet other embodiments, the conductive material is only present in about 90% of the electrode array.

In still other embodiments, the conductive material is only present in about 10%, in about 15%, in about 20%, in about 25%, in about 30%, in about 35%, in about 40%, in about 45%, in about 50%, in about 55%, in about 60%, in about 65%, in about 70%, in about 75%, in about 80%, in about 85% and in about 90% of the electrode array. In yet other embodiments, the conductive material is present in about 10-70% of the electrode array, in about 10-60% of the electrode array, in about 10-50% of the electrode array, in about 10-40% of the electrode or in about 10-30% of the electrode array. In other embodiments, the conductive material is present in about 30-90% of the electrode array, in about 30-80% of the electrode array, in about 30-70% of the electrode array, in about 30-60% of the electrode array or in about 30-50% of the electrode array. In some embodiments, the conductive material is present in about 8 to about 40% of the electrode array.

In yet other embodiments, the conductive material is substantially absent from the center of the individual electrodes in the electrode array. In other embodiments, the conductive material is only present at the edges of the individual electrodes in the electrode array. In still other embodiments, the conductive material is in the shape of an open disk, which comprises conductive material that is discontinuous in the open disk electrode. In some embodiments, the electrode is a hollow ring electrode shape, which comprises conductive material in the electrode array that is substantially absent from the center of the individual electrodes or is only at the edge of the individual electrodes. The hollow ring electrode shape, like the open disk shape, reduces the surface area of the conductive material in an electrode. The reduction in conductive material present on the electrode results in flow in and around the electrode surface, leading to increases in nanoscale analyte captured on the surface of the electrode.

In some embodiments, a layer of non-conductive material is present in certain areas of the electrode or in the proximal vicinity of the electrode array. In one embodiment, a layer of non-conductive material surrounds the electrode array, creating a physical barrier or wall surrounding the array. In some embodiments, the electrode array is depressed into the array material, creating a well or depression on the array surface wherein electrode material or substantially electrode material is present in the well or depression.

In some embodiments, the electrode configuration is in three-dimensions. In some embodiments, the electrode material is folded into an angle configuration. In other embodiments, the electrode material is formed into a triangular tube. In other embodiments, the electrode material is formed into a hollow triangular tube. In still other embodiments, the three dimensional electrode comprises angles between neighboring planar electrode surfaces of less than about 180 degrees, less than about 170 degrees, less than about 160 degrees, less than about 150 degrees, less than about 140 degrees, less than about 130 degrees, less than about 120 degrees, less than about 110 degrees, less than about 100 degrees, less than about 90 degrees, less than about 80 degrees, less than about 70 degrees, but not less than about 60 degrees. In some embodiments, the conductive material configured into angles between neighboring planar electrode surfaces of equal to or less than 180 degrees. In some embodiments, the three dimensional electrode configuration comprises angles between neighboring planar electrode surfaces of more than about 60 degrees, more than about 70 degrees, more than about 80 degrees, more than about 90 degrees, more than about 100 degrees, more than about 110 degrees, more than about 120 degrees, more than about 130 degrees, more than about 140 degrees, more than about 150 degrees, more than about 160 degrees, more than about 170 degrees, but not more than about 180 degrees. In some embodiments, the conductive material configured into angles between neighboring planar electrode surfaces of equal to or more than 60 degrees. In some embodiments, the conductive material within the electrodes is configured into a depressed concave shape. In yet other embodiments, the electrode configuration is a depressed basket electrode. The three-dimensional structure of the electrode increases the total surface area of the electrode, allowing interrogation of more fluid in a defined unit of time.

In some embodiments, the individual electrodes are about 40 μm to about 100 μm in diameter. In still other embodiments, the individual electrodes are about 40 μm, about 45 μm, about 50 μm, about 55 μm, about 60 μm, about 65 μm, about 70 μm, about 75 μm, about 80 μm, about 85 μm, about 90 μm, about 95 μm or about 100 μm in diameter. In yet other embodiments, the individual electrodes are about 40 μm to about 50 μm, about 40 μm to about 60 μm or about 40 μm to about 70 μm. In still other embodiments, the individual electrodes are about 100 μm, about 200 μm, about 300 μm, about 400 μm, about 500 μm, about 600 μm, about 700 μm, about 800 μm, about 900 μm, or about 1000 μm in diameter.

The plurality of alternating current electrodes are optionally configured in any manner suitable for the separation processes described herein. In other embodiments, the array of electrodes as disclosed herein comprises a pattern of electrode configurations, wherein the configuration comprises a repeating unit of electrode arrays. In some embodiments, the edge to edge distance between a parallel set of repeating units is equidistant, or roughly equidistant. Further description of the system or device including electrodes and/or concentration of cells in DEP fields is found in PCT patent publication WO 2009/146143, which is incorporated herein for such disclosure.

In some embodiments, the electrodes disclosed herein comprise any suitable metal. In other embodiments, the electrodes disclosed herein comprise a noble metal. In some embodiments, the electrodes can include but are not limited to: aluminum, copper, carbon, iron, silver, gold, palladium, platinum, iridium, platinum iridium alloy, ruthenium, rhodium, osmium, tantalum, titanium, tungsten, polysilicon, and indium tin oxide, or combinations thereof, as well as silicide materials such as platinum silicide, titanium silicide, gold silicide, or tungsten silicide. In some embodiments, the electrodes can comprise a conductive ink capable of being screen-printed. In some embodiments, the electrodes comprise a conductive polymer, such as polyacetylene or polythiophene.

In one embodiment, the electrode material is about 100 to about 1000 nm thick. In some embodiments, the electrode material is about 200 to about 800 nm thick. In yet other embodiments, the electrode material is about 300 to about 500 nm thick. In still other embodiments, the electrode material is about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm or about 1000 nm thick.

In some embodiments, an adhesion layer is deposited or printed onto the array as a protective layer prior to deposition of the electrode material. In some embodiments, the adhesion layer comprises any suitable material. In one embodiment, the adhesion layer comprises titanium or tungsten. In other embodiments, the adhesion layer is between about 10 to about 50 nm thick. In some embodiments, the adhesion layer is between about 20 to about 40 nm thick. In yet other embodiments, the adhesion layer is between about 20 to about 30 nm thick. In still other embodiments, the adhesion layer is about 10 nm, about 20 nm, about 30 nm, about 40 nm or about 50 nm thick.

In some embodiments, the edge to edge (E2E) to diameter ratio of an individual electrode is about 10 μm to about 500 μm. In some embodiments, the E2E of an electrode is about 50 μm to about 300 μm. In yet other embodiments, the E2E of an electrode is about 100 μm to about 200 μm. In still other embodiments, the E2E of an electrode is about 50 μm, about 60 μm, about 70 μm, about 80 μm, about 90 μm, about 100 μm, about 110 μm, about 120 μmm about 130 μm, about 140 μm, about 150 μm, about 160 μm, about 170 μm, about 180 μm, about 190 μm, about 200 μm, about 210 μm, about 220 μm, about 230 μm, about 240 μm, about 250 μm, about 260 μm, about 270 μm, about 280 μm, about 290 μm, about 300 μm, about 310 μm, about 320 μm, about 330 μm, about 340 μm, about 350 μm, about 360 μm, about 370 μm, about 380 μm, about 390 μm, about 400 μm, about 410 μm, about 420 μm, about 430 μm, about 440 μm, about 450 μm, about 460 μm, about 470 μm, about 480 μm, about 490 μm or about 500 μm. In some embodiments, the E2E of an electrode is about 750 μm, about 1000 μm, about 1500 μm, or about 2000 μm.

In some embodiments, the electrodes disclosed herein are dry-etched. In some embodiments, the electrodes are wet etched. In some embodiments, the electrodes undergo a combination of dry etching and wet etching.

In some embodiments, each electrode is individually site-controlled.

In some embodiments, an array of electrodes as disclosed herein is controlled as a unit.

The array can be of any suitable material. In some embodiments, the array comprises plastic or silica. In some embodiments, the array comprises silicon dioxide. In some embodiments, the array comprises aluminum.

In some embodiments, a passivation layer is employed. In some embodiments, a passivation layer can be formed from any suitable material known in the art. In some embodiments, the passivation layer comprises silicon nitride. In some embodiments, the passivation layer comprises silicon dioxide. In some embodiments, the passivation layer has a relative electrical permittivity of from about 2.0 to about 8.0. In some embodiments, the passivation layer has a relative electrical permittivity of from about 3.0 to about 8.0, about 4.0 to about 8.0 or about 5.0 to about 8.0. In some embodiments, the passivation layer has a relative electrical permittivity of about 2.0 to about 4.0. In some embodiments, the passivation layer has a relative electrical permittivity of from about 2.0 to about 3.0. In some embodiments, the passivation layer has a relative electrical permittivity of about 2.0, about 2.5, about 3.0, about 3.5 or about 4.0.

In some embodiments, the passivation layer is between about 0.1 microns and about 10 microns in thickness. In some embodiments, the passivation layer is between about 0.5 microns and 8 microns in thickness. In some embodiments, the passivation layer is between about 1.0 micron and 5 microns in thickness. In some embodiments, the passivation layer is between about 1.0 micron and 4 microns in thickness. In some embodiments, the passivation layer is between about 1.0 micron and 3 microns in thickness. In some embodiments, the passivation layer is between about 0.25 microns and 2 microns in thickness. In some embodiments, the passivation layer is between about 0.25 microns and 1 micron in thickness.

In some embodiments, the passivation layer is comprised of any suitable insulative low k dielectric material, including but not limited to silicon nitride, silicon dioxide or titanium dioxide. In some embodiments, the passivation layer is chosen from the group consisting of polyamids, carbon, doped silicon nitride, carbon doped silicon dioxide, fluorine doped silicon nitride, fluorine doped silicon dioxide, porous silicon dioxide, or any combinations thereof. In some embodiments, the passivation layer can comprise a dielectric ink capable of being screen-printed.

Electrode Geometry

In some embodiments, the electrodes disclosed herein can be arranged in any manner suitable for practicing the methods disclosed herein.

In various embodiments, a variety of configurations for the devices are possible. For example, a device comprising a larger array of electrodes, for example in a square or rectangular pattern configured to create a repeating non-uniform electric field to enable AC electrokinetics. For illustrative purposes only, a suitable electrode array may include, but is not limited to, a 10×10 electrode configuration, a 50×50 electrode configuration, a 10×100 electrode configuration, 20×100 electrode configuration, or a 20×80 electrode configuration.

Figure 2:
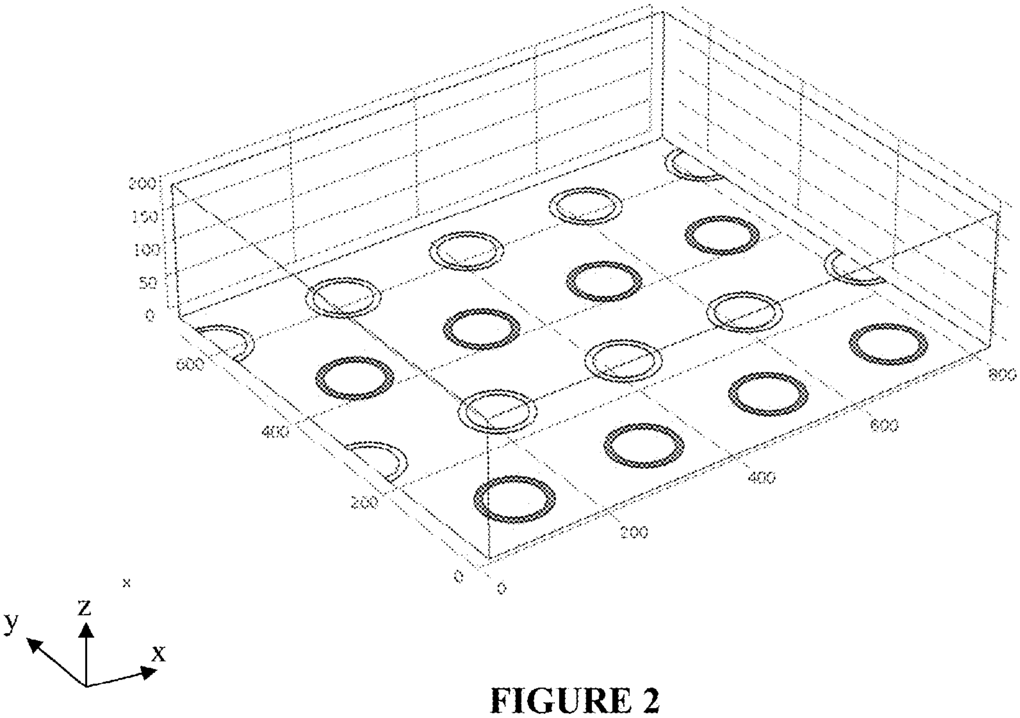
FIG. 2 exemplifies an electrode configuration in the shape of a hollow ring. The electrode comprises conductive material around the edges of the electrode. The color filled electrodes represent the anodes and the non-color filled electrodes represent the cathodes.

In some embodiments, the electrodes are in a dot configuration, e.g. the electrodes comprise a generally circular or round configuration (see, e.g., FIGS. 1 & 2). In some embodiments, the electrodes are configured as disks. In some embodiments, the electrodes are configured as rings. In some embodiments, the angle of orientation between dots is from about 30° to about 90° degrees. In some embodiments, the angle of orientation between dots is from about 25° to about 60°. In some embodiments, the angle of orientation between dots is from about 30° to about 55°. In some embodiments, the angle of orientation between dots is from about 30° to about 50°. In some embodiments, the angle of orientation between dots is from about 35° to about 45°. In some embodiments, the angle of orientation between dots is about 25°. In some embodiments, the angle of orientation between dots is about 30°. In some embodiments, the angle of orientation between dots is about 35°. In some embodiments, the angle of orientation between dots is about 40°. In some embodiments, the angle of orientation between dots is about 45°. In some embodiments, the angle of orientation between dots is about 50°. In some embodiments, the angle of orientation between dots is about 55°. In some embodiments, the angle of orientation between dots is about 60°. In some embodiments, the angle of orientation between dots is about 65°. In some embodiments, the angle of orientation between dots is about 70°. In some embodiments, the angle of orientation between dots is about 75°. In some embodiments, the angle of orientation between dots is about 80°. In some embodiments, the angle of orientation between dots is about 85°. In some embodiments, the angle of orientation between dots is about 90°.

Figure 3:
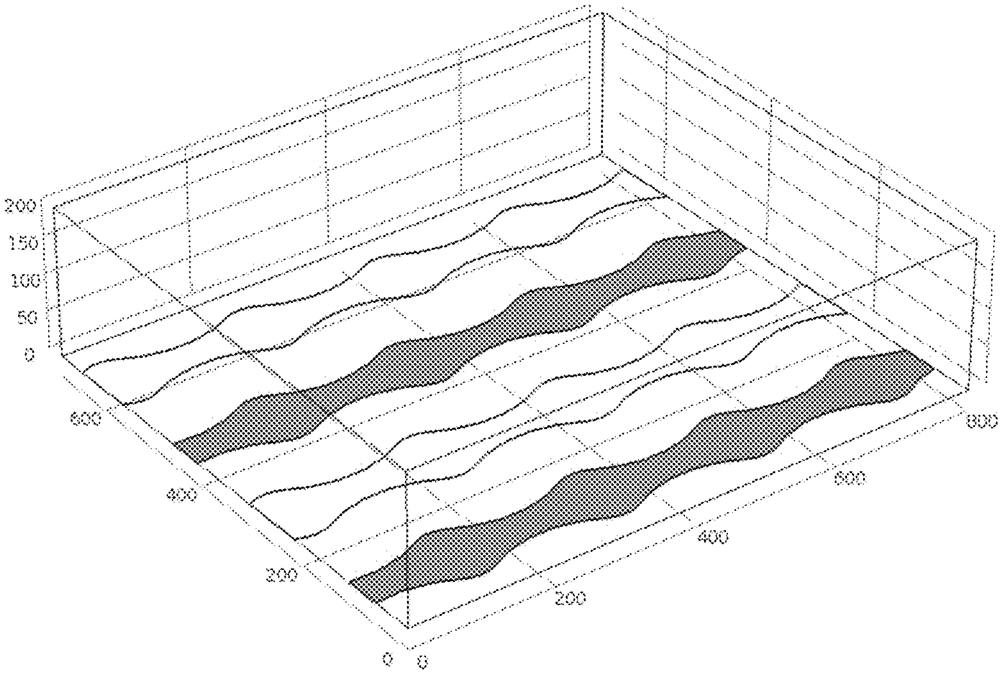
FIG. 3 exemplifies an electrode configuration, wherein the electrodes are in a wavy line configuration, wherein the configuration comprises a repeating unit comprising the shape of a pair of dots connected by a linker, wherein the linker tapers inward toward the midpoint between the pair of dots, wherein the diameters of the dots are the widest points along the length of the repeating unit, wherein the edge to edge distance between a parallel set of repeating units is equidistant, or roughly equidistant. The electrode comprises conductive material on every other wavy line configuration. The color filled electrodes represent the anodes and the non-color filled electrodes represent the cathodes.
Figure 4:
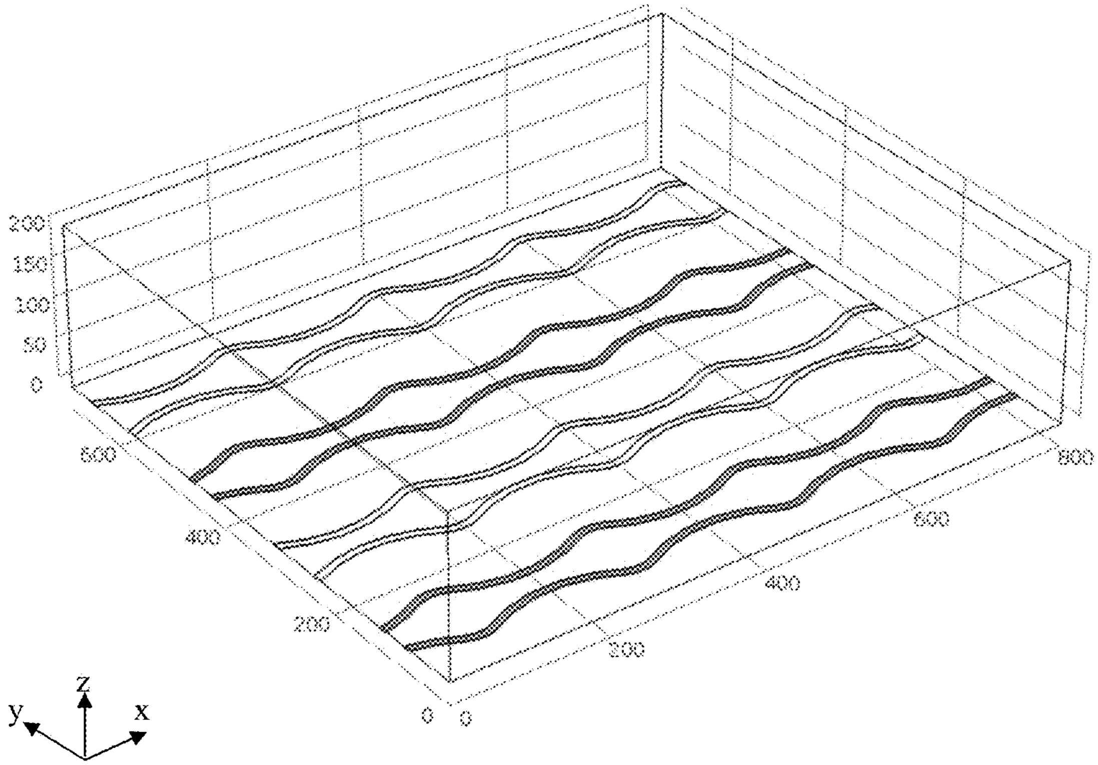
FIG. 4 exemplifies an electrode configuration in the shape of a continuous hollow wavy line configuration. The electrodes comprise conductive material around the edges of the electrode. The color filled electrodes represent the anodes and the non-color filled electrodes represent the cathodes.

In other embodiments, the electrodes are in a non-circular configuration (see, e.g., FIGS. 3 & 4). In some embodiments, the angle of orientation between non-circular configurations is between about 25 and 90 degrees. In some embodiments, the angle of orientation between non-circular configurations is from about 30° to about 90° degrees. In some embodiments, the angle of orientation between non-circular configurations is from about 25° to about 60°. In some embodiments, the angle of orientation between non-circular configurations is from about 30° to about 55°. In some embodiments, the angle of orientation between non-circular configurations is from about 30° to about 50°. In some embodiments, the angle of orientation between non-circular configurations is from about 35° to about 45°. In some embodiments, the angle of orientation between non-circular configurations is about 25°. In some embodiments, the angle of orientation between non-circular configurations is about 30°. In some embodiments, the angle of orientation between non-circular configurations is about 35°. In some embodiments, the angle of orientation between non-circular configurations is about 40°. In some embodiments, the angle of orientation between non-circular configurations is about 45°. In some embodiments, the angle of orientation between non-circular configurations is about 50°. In some embodiments, the angle of orientation between non-circular configurations is about 55°. In some embodiments, the angle of orientation between non-circular configurations is about 60°. In some embodiments, the angle of orientation between non-circular configurations is about 65°. In some embodiments, the angle of orientation between non-circular configurations is about 70°. In some embodiments, the angle of orientation between non-circular configurations is about 75°. In some embodiments, the angle of orientation between non-circular configurations is about 80°. In some embodiments, the angle of orientation between non-circular configurations is about 85°. In some embodiments, the angle of orientation between non-circular configurations is about 90°.

In some embodiments, the electrodes are in a substantially elongated configuration.

In some embodiments, the electrodes are in a configuration resembling wavy or nonlinear lines (see, e.g., FIGS. 3 & 4). In some embodiments, the array of electrodes is in a wavy or nonlinear line configuration, wherein the configuration comprises a repeating unit comprising the shape of a pair of dots connected by a linker, wherein the dots and linker define the boundaries of the electrode, wherein the linker tapers inward towards or at the midpoint between the pair of dots, wherein the diameters of the dots are the widest points along the length of the repeating unit, wherein the edge to edge distance between a parallel set of repeating units is equidistant, or roughly equidistant. In some embodiments, the electrodes are strips resembling wavy lines. In some embodiments, the edge to edge distance between the electrodes is equidistant, or roughly equidistant throughout the wavy line configuration. In some embodiments, the use of wavy line electrodes, as disclosed herein, lead to an enhanced DEP field gradient.

In some embodiments, the electrodes disclosed herein are in a planar configuration. In some embodiments, the electrodes disclosed herein are in a non-planar configuration (see, e.g., FIG. 5).

In some embodiments, the devices disclosed herein surface selectively captures nanoscale biomolecules on its surface. For example, the devices disclosed herein may capture nanoscale analytes such as nucleic acids, by, for example, a. nucleic acid hybridization; b. antibody—antigen interactions; c. biotin—avidin interactions; d. ionic or electrostatic interactions; or e. any combination thereof. The devices disclosed herein, therefore, may incorporate a functionalized surface which includes capture molecules, such as complementary nucleic acid probes, antibodies or other protein captures capable of capturing biomolecules (such as nucleic acids), biotin or other anchoring captures capable of capturing complementary target molecules such as avidin, capture molecules capable of capturing biomolecules (such as nucleic acids) by ionic or electrostatic interactions, or any combination thereof.

In some embodiments, the surface is functionalized to minimize and/or inhibit nonspecific binding interactions by: a. polymers (e.g., polyethylene glycol PEG); b. ionic or electrostatic interactions; c. surfactants; or d. any combination thereof. In some embodiments, the methods disclosed herein include use of additives which reduce non-specific binding interactions by interfering in such interactions, such as Tween 20 and the like, bovine serum albumin, nonspecific immunoglobulins, etc.

In some embodiments, the device comprises a plurality of microelectrode devices oriented (a) flat side by side, (b) facing vertically, or (c) facing horizontally. In other embodiments, the electrodes are in a sandwiched configuration, e.g. stacked on top of each other in a vertical format.

Hydrogels

Overlaying electrode structures with one or more layers of materials can reduce the deleterious electrochemistry effects, including but not limited to electrolysis reactions, heating, and chaotic fluid movement that may occur on or near the electrodes, and still allow the effective separation of cells, bacteria, virus, nanoparticles, DNA, and other biomolecules to be carried out. In some embodiments, the materials layered over the electrode structures may be one or more porous layers. In other embodiments, the one or more porous layers is a polymer layer. In other embodiments, the one or more porous layers is a hydrogel.

In general, the hydrogel should have sufficient mechanical strength and be relatively chemically inert such that it will be able to endure the electrochemical effects at the electrode surface without disconfiguration or decomposition. In general, the hydrogel is sufficiently permeable to small aqueous ions, but keeps biomolecules away from the electrode surface.

In some embodiments, the hydrogel is a single layer, or coating.

In some embodiments, the hydrogel comprises a gradient of porosity, wherein the bottom of the hydrogel layer has greater porosity than the top of the hydrogel layer.

In some embodiments, the hydrogel comprises multiple layers or coatings. In some embodiments, the hydrogel comprises two coats. In some embodiments, the hydrogel comprises three coats. In some embodiments, the bottom (first) coating has greater porosity than subsequent coatings. In some embodiments, the top coat is has less porosity than the first coating. In some embodiments, the top coat has a mean pore diameter that functions as a size cut-off for particles of greater than 100 picometers in diameter.

In some embodiments, the hydrogel has a conductivity from about 0.001 S/m to about 10 S/m. In some embodiments, the hydrogel has a conductivity from about 0.01 S/m to about 10 S/m. In some embodiments, the hydrogel has a conductivity from about 0.1 S/m to about 10 S/m. In some embodiments, the hydrogel has a conductivity from about 1.0 S/m to about 10 S/m. In some embodiments, the hydrogel has a conductivity from about 0.01 S/m to about 5 S/m. In some embodiments, the hydrogel has a conductivity from about 0.01 S/m to about 4 S/m. In some embodiments, the hydrogel has a conductivity from about 0.01 S/m to about 3 S/m. In some embodiments, the hydrogel has a conductivity from about 0.01 S/m to about 2 S/m. In some embodiments, the hydrogel has a conductivity from about 0.1 S/m to about 5 S/m. In some embodiments, the hydrogel has a conductivity from about 0.1 S/m to about 4 S/m. In some embodiments, the hydrogel has a conductivity from about 0.1 S/m to about 3 S/m. In some embodiments, the hydrogel has a conductivity from about 0.1 S/m to about 2 S/m. In some embodiments, the hydrogel has a conductivity from about 0.1 S/m to about 1.5 S/m. In some embodiments, the hydrogel has a conductivity from about 0.1 S/m to about 1.0 S/m.

In some embodiments, the hydrogel has a conductivity of about 0.1 S/m. In some embodiments, the hydrogel has a conductivity of about 0.2 S/m. In some embodiments, the hydrogel has a conductivity of about 0.3 S/m. In some embodiments, the hydrogel has a conductivity of about 0.4 S/m. In some embodiments, the hydrogel has a conductivity of about 0.5 S/m. In some embodiments, the hydrogel has a conductivity of about 0.6 S/m. In some embodiments, the hydrogel has a conductivity of about 0.7 S/m. In some embodiments, the hydrogel has a conductivity of about 0.8 S/m. In some embodiments, the hydrogel has a conductivity of about 0.9 S/m. In some embodiments, the hydrogel has a conductivity of about 1.0 S/m.

In some embodiments, the hydrogel has a thickness from about 0.1 microns to about 10 microns. In some embodiments, the hydrogel has a thickness from about 0.1 microns to about 5 microns. In some embodiments, the hydrogel has a thickness from about 0.1 microns to about 4 microns. In some embodiments, the hydrogel has a thickness from about 0.1 microns to about 3 microns. In some embodiments, the hydrogel has a thickness from about 0.1 microns to about 2 microns. In some embodiments, the hydrogel has a thickness from about 1 micron to about 5 microns. In some embodiments, the hydrogel has a thickness from about 1 micron to about 4 microns. In some embodiments, the hydrogel has a thickness from about 1 micron to about 3 microns. In some embodiments, the hydrogel has a thickness from about 1 micron to about 2 microns. In some embodiments, the hydrogel has a thickness from about 0.5 microns to about 1 micron.

In some embodiments, the viscosity of a hydrogel solution prior to spin-coating or deposition onto the array of electrodes ranges from about 0.5 cP to about 5 cP. In some embodiments, a single coating of hydrogel solution has a viscosity of between about 0.75 cP and 5 cP prior to spin-coating or deposition onto the array of electrodes. In some embodiments, in a multi-coat hydrogel, the first hydrogel solution has a viscosity from about 0.5 cP to about 1.5 cP prior to spin coating or deposition onto the array of electrodes. In some embodiments, the second hydrogel solution has a viscosity from about 1 cP to about 3 cP. The viscosity of the hydrogel solution is based on the polymers concentration (0.1%-10%) and polymers molecular weight (10,000 to 300,000) in the solvent and the starting viscosity of the solvent.

In some embodiments, the first hydrogel coating has a thickness between about 0.5 microns and 1 micron. In some embodiments, the first hydrogel coating has a thickness between about 0.5 microns and 0.75 microns. In some embodiments, the first hydrogel coating has a thickness between about 0.75 and 1 micron. In some embodiments, the second hydrogel coating has a thickness between about 0.2 microns and 0.5 microns. In some embodiments, the second hydrogel coating has a thickness between about 0.2 and 0.4 microns. In some embodiments, the second hydrogel coating has a thickness between about 0.2 and 0.3 microns. In some embodiments, the second hydrogel coating has a thickness between about 0.3 and 0.4 microns.

In some embodiments, the hydrogel comprises any suitable synthetic polymer forming a hydrogel. In general, any sufficiently hydrophilic and polymerizable molecule may be utilized in the production of a synthetic polymer hydrogel for use as disclosed herein. Polymerizable moieties in the monomers may include alkenyl moieties including but not limited to substituted or unsubstituted α,β, unsaturated carbonyls wherein the double bond is directly attached to a carbon which is double bonded to an oxygen and single bonded to another oxygen, nitrogen, sulfur, halogen, or carbon; vinyl, wherein the double bond is singly bonded to an oxygen, nitrogen, halogen, phosphorus or sulfur; allyl, wherein the double bond is singly bonded to a carbon which is bonded to an oxygen, nitrogen, halogen, phosphorus or sulfur; homoallyl, wherein the double bond is singly bonded to a carbon which is singly bonded to another carbon which is then singly bonded to an oxygen, nitrogen, halogen, phosphorus or sulfur; alkynyl moieties wherein a triple bond exists between two carbon atoms. In some embodiments, acryloyl or acrylamido monomers such as acrylates, methacrylates, acrylamides, methacrylamides, etc., are useful for formation of hydrogels as disclosed herein. More preferred acrylamido monomers include acrylamides, N-substituted acrylamides, N-substituted methacrylamides, and methacrylamide. In some embodiments, a hydrogel comprises polymers such as epoxide-based polymers, vinyl-based polymers, allyl-based polymers, homoallyl-based polymers, cyclic anhydride-based polymers, ester-based polymers, ether-based polymers, alkylene-glycol based polymers (e.g., polypropylene glycol), and the like.

In some embodiments, the hydrogel comprises poly (2-hydroxyethylmethacrylate) (pHEMA), cellulose acetate, cellulose acetate phthalate, cellulose acetate butyrate, or any appropriate acrylamide or vinyl-based polymer, or a derivative thereof.

In some embodiments, the hydrogel is applied by vapor deposition.

In some embodiments, the hydrogel is polymerized via atom-transfer radical-polymerization (ATRP).

In some embodiments, the hydrogel is polymerized via Activators ReGenerated by Electron Transfer-polymerization (ARGET).

In some embodiments, the hydrogel is polymerized via Initiators for Continuous Activator Regeneration-polymerization (ICAR).

In some embodiments, the hydrogel is polymerized via Nitroxide-Mediated Radical Polymerization (NMP)

In some embodiments, the hydrogel is polymerized via Photoinitiated-ATRP.

In some embodiments, the hydrogel is polymerized via reversible addition-fragmentation chain-transfer (RAFT) polymerization.

In some embodiments, additives are added to a hydrogel to increase conductivity of the gel. In some embodiments, hydrogel additives are conductive polymers (e.g., PEDOT: PSS), salts (e.g., copper chloride), metals (e.g., gold), plasticizers (e.g., PEG200, PEG 400, or PEG 600), or co-solvents.

In some embodiments, the hydrogel also comprises compounds or materials which help maintain the stability of the DNA hybrids, including, but not limited to histidine, histidine peptides, polyhistidine, lysine, lysine peptides, and other cationic compounds or substances.

In various embodiments provided herein, a method described herein comprises producing a DEP field region and optionally a second DEP field region with the array. In various embodiments provided herein, a device or system described herein is capable of producing a DEP field region and optionally a second DEP field region with the array. In some instances, the first and second field regions are part of a single field (e.g., the first and second regions are present at the same time, but are found at different locations within the device and/or upon the array). In some embodiments, the first and second field regions are different fields (e.g. the first region is created by energizing the electrodes at a first time, and the second region is created by energizing the electrodes a second time). In specific aspects, the DEP field region is suitable for concentrating or isolating cells (e.g., into a low field DEP region). In some embodiments, the optional second DEP field region is suitable for concentrating smaller particles, such as molecules (e.g., nucleic acid), for example into a high field DEP region. In some instances, a method described herein optionally excludes use of either the first or second DEP field region.

In some embodiments, the DEP field region is in the same chamber of a device as disclosed herein as the optional second DEP field region. In some embodiments, the DEP field region and the optional second DEP field region occupy the same area of the array of electrodes.

In some embodiments, the DEP field region is in a separate chamber of a device as disclosed herein, or a separate device entirely, from the second DEP field region.

DEP Field Region

In some aspects, e.g., high conductance buffers (>100 mS/m), the method described herein comprises applying a sample comprising nanoscale analytes and other particulate material to a device comprising an array of electrodes as disclosed herein, and, thereby, isolating and collecting the nanoscale analytes in a DEP field region. In some aspects, the devices and systems described herein are capable of applying a sample comprising nanoscale analytes and other particulate material to the device comprising an array of electrodes as disclosed herein, and, thereby, isolating and collecting the nanoscale analytes in a DEP field region. Subsequent or concurrent second, or optional third and fourth DEP regions, may collect or isolate other sample components, including intact cells and other particulate material.

The DEP field region generated may be any field region suitable for isolating and collecting nanoscale analytes from a sample. For this application, the nanoscale analytes are generally concentrated near the array of electrodes as disclosed herein. In some embodiments, the DEP field region is a dielectrophoretic low field region. In some embodiments, the DEP field region is a dielectrophoretic high field region. In some aspects, e.g. low conductance buffers (<100 mS/m), the method described herein comprises applying a fluid comprising cells to a device comprising an array of electrodes as disclosed herein, and, thereby, concentrating the nanoscale analytes in a DEP field region.

In some aspects, the devices and systems described herein are capable of applying a sample comprising nanoscale analytes and other particulate material to the device comprising an array of electrodes as disclosed herein, and concentrating the nanoscale analytes in a DEP field region. In some embodiments, the nanoscale analytes are captured in a dielectrophoretic high field region. In some embodiments, the nanoscale analytes are captured in a dielectrophoretic low-field region. High versus low field capture is generally dependent on the conductivity of the fluid, wherein generally, the crossover point between high and low conductivity fluid is between about 300-500 mS/m. In some embodiments, the DEP field region is a dielectrophoretic low field region performed in fluid conductivity of greater than about 300 mS/m. In some embodiments, the DEP field region is a dielectrophoretic low field region performed in fluid conductivity of less than about 300 mS/m. In some embodiments, the DEP field region is a dielectrophoretic high field region performed in fluid conductivity of greater than about 300 mS/m. In some embodiments, the DEP field region is a dielectrophoretic high field region performed in fluid conductivity of less than about 300 mS/m. In some embodiments, the DEP field region is a dielectrophoretic low field region performed in fluid conductivity of greater than about 500 mS/m. In some embodiments, the DEP field region is a dielectrophoretic low field region performed in fluid conductivity of less than about 500 mS/m. In some embodiments, the DEP field region is a dielectrophoretic high field region performed in fluid conductivity of greater than about 500 mS/m. In some embodiments, the DEP field region is a dielectrophoretic high field region performed in fluid conductivity of less than about 500 mS/m.

In some embodiments, the dielectrophoretic field region is produced by an alternating current. The alternating current has any amperage, voltage, frequency, and the like suitable for concentrating cells. In some embodiments, the dielectrophoretic field region is produced using an alternating current having an amperage of 0.1 micro Amperes-10 Amperes; a voltage of 1-50 Volts peak to peak; and/or a frequency of 1-10,000,000 Hz. In some embodiments, the DEP field region is produced using an alternating current having a voltage of 5-25 volts peak to peak. In some embodiments, the DEP field region is produced using an alternating current having a frequency of from 3-15 kHz.

In some embodiments, the DEP field region is produced using an alternating current having an amperage of 100 milliamps to 5 amps. In some embodiments, the DEP field region is produced using an alternating current having an amperage of 0.5 Ampere-1 Ampere. In some embodiments, the DEP field region is produced using an alternating current having an amperage of 0.5 Ampere-5 Ampere. In some embodiments, the DEP field region is produced using an alternating current having an amperage of 100 milliamps-1 Ampere. In some embodiments, the DEP field region is produced using an alternating current having an amperage of 500 milli Amperes-2.5 Amperes.

In some embodiments, the DEP field region is produced using an alternating current having a voltage of 1-25 Volts peak to peak. In some embodiments, the DEP field region is produced using an alternating current having a voltage of 1-10 Volts peak to peak. In some embodiments, the DEP field region is produced using an alternating current having a voltage of 25-50 Volts peak to peak. In some embodiments, the DEP field region is produced using a frequency of from 10-1,000,000 Hz. In some embodiments, the DEP field region is produced using a frequency of from 100-100,000 Hz. In some embodiments, the DEP field region is produced using a frequency of from 100-10,000 Hz. In some embodiments, the DEP field region is produced using a frequency of from 10,000-100,000 Hz. In some embodiments, the DEP field region is produced using a frequency of from 100,000-1,000,000 Hz.

In some embodiments, the first dielectrophoretic field region is produced by a direct current. The direct current has any amperage, voltage, frequency, and the like suitable for concentrating cells. In some embodiments, the first dielectrophoretic field region is produced using a direct current having an amperage of 0.1 micro Amperes-1 Amperes; a voltage of 10 milli Volts-10 Volts; and/or a pulse width of 1 milliseconds-1000 seconds and a pulse frequency of 0.001-1000 Hz. In some embodiments, the DEP field region is produced using a direct current having an amperage of 1 micro Amperes-1 Amperes. In some embodiments, the DEP field region is produced using a direct current having an amperage of 100 micro Amperes-500 milli Amperes. In some embodiments, the DEP field region is produced using a direct current having an amperage of 1 milli Amperes-1 Amperes. In some embodiments, the DEP field region is produced using a direct current having an amperage of 1 micro Amperes-1 milli Amperes. In some embodiments, the DEP field region is produced using a direct current having a pulse width of 500 milliseconds-500 seconds. In some embodiments, the DEP field region is produced using a direct current having a pulse width of 500 milliseconds-100 seconds. In some embodiments, the DEP field region is produced using a direct current having a pulse width of 1 second-1000 seconds. In some embodiments, the DEP field region is produced using a direct current having a pulse width of 500 milliseconds-1 second. In some embodiments, the DEP field region is produced using a pulse frequency of 0.01-1000 Hz. In some embodiments, the DEP field region is produced using a pulse frequency of 0.1-100 Hz. In some embodiments, the DEP field region is produced using a pulse frequency of 1-100 Hz. In some embodiments, the DEP field region is produced using a pulse frequency of 100-1000 Hz.

In some embodiments, the sample may comprise a mixture of cell types. For example, blood comprises red blood cells and white blood cells. Environmental samples comprise many types of cells and other particulate material over a wide range of concentrations. In some embodiments, one cell type (or any number of cell types less than the total number of cell types comprising the sample) may be preferentially concentrated in a DEP field region. In another non-limiting example, the DEP field is operated in a manner that specifically concentrates viruses and not cells (e.g., in a fluid with conductivity of greater than 300 mS/m, viruses concentrate in a DEP high field region, while larger cells will concentrate in a DEP low field region).

Accordingly, in some embodiments, a method, device or system described herein is suitable for isolating or separating specific cell types in order to enable efficient isolation and collection of nanoscale analytes. In some embodiments, the DEP field of the method, device or system is specifically tuned to allow for the separation or concentration of a specific type of cell into a field region of the DEP field. In some embodiments, a method, device or system described herein provides more than one field region wherein more than one type of cell is isolated or concentrated. In some embodiments, a method, device, or system described herein is tunable so as to allow isolation or concentration of different types of cells within the DEP field regions thereof. In some embodiments, a method provided herein further comprises tuning the DEP field. In some embodiments, a device or system provided herein is capable of having the DEP field tuned. In some instances, such tuning may be in providing a DEP particularly suited for the desired purpose. For example, modifications in the array, the energy, or another parameter are optionally utilized to tune the DEP field. Tuning parameters for finer resolution include electrode diameter, edge to edge distance between electrodes, voltage, frequency, fluid conductivity and hydrogel composition.

In some embodiments, the DEP field region comprises the entirety of an array of electrodes as disclosed herein. In some embodiments, the DEP field region comprises a portion of an array of electrodes as disclosed herein. In some embodiments, the DEP field region comprises about 90%, about 80%, about 70%, about 60%, about 50%, about 40%, about 30%, about 25%, about 20%, or about 10% of an array of electrodes as disclosed herein. In some embodiments, the DEP field region comprises about a third of an array of electrodes as disclosed herein.

Cell Lysis

In one aspect, following concentrating the cells in a first dielectrophoretic field region, the method involves freeing nanoscale analytes from the cell. In another aspect, the devices and systems described herein are capable of freeing nucleic acids from the cells. In some embodiments, the nucleic acids are freed from the cells in the first DEP field region.

In some embodiments, the methods described herein free nucleic acids from a plurality of cells by lysing the cells. In some embodiments, the devices and systems described herein are capable of freeing nucleic acids from a plurality of cells by lysing the cells. One method of cell lysis involves applying a direct current to the cells after isolation of the cells on the array. The direct current has any suitable amperage, voltage, and the like suitable for lysing cells. In some embodiments, the current has a voltage of about 1 Volt to about 500 Volts. In some embodiments, the current has a voltage of about 10 Volts to about 500 Volts. In other embodiments, the current has a voltage of about 10 Volts to about 250 Volts. In still other embodiments, the current has a voltage of about 50 Volts to about 150 Volts. Voltage is generally the driver of cell lysis, as high electric fields result in failed membrane integrity.

In some embodiments, the direct current used for lysis comprises one or more pulses having any duration, frequency, and the like suitable for lysing cells. In some embodiments, a voltage of about 100 volts is applied for about 1 millisecond to lyse cells. In some embodiments, the voltage of about 100 volts is applied 2 or 3 times over the source of a second.

In some embodiments, the frequency of the direct current depends on volts/cm, pulse width, and the fluid conductivity. In some embodiments, the pulse has a frequency of about 0.001 to about 1000 Hz. In some embodiments, the pulse has a frequency from about 10 to about 200 Hz. In other embodiments, the pulse has a frequency of about 0.01 Hz-1000 Hz. In still other embodiments, the pulse has a frequency of about 0.1 Hz-1000 Hz, about 1 Hz-1000 Hz, about 1 Hz-500 Hz, about 1 Hz-400 Hz, about 1 Hz-300 Hz, or about 1 Hz-about 250 Hz. In some embodiments, the pulse has a frequency of about 0.1 Hz. In other embodiments, the pulse has a frequency of about 1 Hz. In still other embodiments, the pulse has a frequency of about 5 Hz, about 10 Hz, about 50 Hz, about 100 Hz, about 200 Hz, about 300 Hz, about 400 Hz, about 500 Hz, about 600 Hz, about 700 Hz, about 800 Hz, about 900 Hz or about 1000 Hz.

In other embodiments, the pulse has a duration of about 1 millisecond (ms)-1000 seconds (s). In some embodiments, the pulse has a duration of about 10 ms-1000 s. In still other embodiments, the pulse has a duration of about 100 ms-1000 s, about 1 s-1000 s, about 1 s-500 s, about 1 s-250 s or about 1 s-150 s. In some embodiments, the pulse has a duration of about 1 ms, about 10 ms, about 100 ms, about 1 s, about 2 s, about 3 s, about 4 s, about 5 s, about 6 s, about 7 s, about 8 s, about 9 s, about 10 s, about 20 s, about 50 s, about 100 s, about 200 s, about 300 s, about 500 s or about 1000 s. In some embodiments, the pulse has a frequency of 0.2 to 200 Hz with duty cycles from 10-50%.

In some embodiments, the direct current is applied once, or as multiple pulses. Any suitable number of pulses may be applied including about 1-20 pulses. There is any suitable amount of time between pulses including about 1 millisecond-1000 seconds. In some embodiments, the pulse duration is 0.01 to 10 seconds.

In some embodiments, the cells are lysed using other methods in combination with a direct current applied to the isolated cells. In yet other embodiments, the cells are lysed without use of direct current. In various aspects, the devices and systems are capable of lysing cells with direct current in combination with other means, or may be capable of lysing cells without the use of direct current. Any method of cell lysis known to those skilled in the art may be suitable including, but not limited to application of a chemical lysing agent (e.g., an acid), an enzymatic lysing agent, heat, pressure, shear force, sonic energy, osmotic shock, or combinations thereof. Lysozyme is an example of an enzymatic-lysing agent.

Nanoscale Analytes Isolation and Yields Thereof

In one aspect, described herein are methods and devices for isolating a nanoscale analyte from a sample. In some embodiments, the nanoscale analyte is less than 1000 nm in diameter. In other embodiments, the nanoscale analyte is less than 500 nm in diameter. In some embodiments, the nanoscale analyte is less than 250 nm in diameter. In some embodiments, the nanoscale analyte is between about 100 nm to about 1000 nm in diameter. In other embodiments, the nanoscale analyte is between about 250 nm to about 800 nm in diameter. In still other embodiments, the nanoscale analyte is between about 300 nm to about 500 nm in diameter.

In some embodiments, the nanoscale analyte is less than 1000 μm in diameter. In other embodiments, the nanoscale analyte is less than 500 μm in diameter. In some embodiments, the nanoscale analyte is less than 250 μm in diameter. In some embodiments, the nanoscale analyte is between about 100 μm to about 1000 μm in diameter. In other embodiments, the nanoscale analyte is between about 250 μm to about 800 μm in diameter. In still other embodiments, the nanoscale analyte is between about 300 μm to about 500 μm in diameter.

In some embodiments, the method, device, or system described herein is optionally utilized to obtain, isolate, or separate any desired nanoscale analyte that may be obtained from such a method, device or system. In some embodiments, the nanoscale analyte is a nucleic acid. In other the nucleic acids isolated by the methods, devices and systems described herein include DNA (deoxyribonucleic acid), RNA (ribonucleic acid), and combinations thereof. In some embodiments, the nucleic acid is isolated in a form suitable for sequencing or further manipulation of the nucleic acid, including amplification, ligation or cloning.

In various embodiments, an isolated or separated nanoscale analyte is a composition comprising nanoscale analyte that is free from at least 99% by mass of other materials, free from at least 99% by mass of residual cellular material, free from at least 98% by mass of other materials, free from at least 98% by mass of residual cellular material, free from at least 95% by mass of other materials, free from at least 95% by mass of residual cellular material, free from at least 90% by mass of other materials, free from at least 90% by mass of residual cellular material, free from at least 80% by mass of other materials, free from at least 80% by mass of residual cellular material, free from at least 70% by mass of other materials, free from at least 70% by mass of residual cellular material, free from at least 60% by mass of other materials, free from at least 60% by mass of residual cellular material, free from at least 50% by mass of other materials, free from at least 50% by mass of residual cellular material, free from at least 30% by mass of other materials, free from at least 30% by mass of residual cellular material, free from at least 10% by mass of other materials, free from at least 10% by mass of residual cellular material, free from at least 5% by mass of other materials, or free from at least 5% by mass of residual cellular material.

In various embodiments, the nanoscale analyte has any suitable purity. For example, if a enzymatic assay requires nanoscale analyte samples having about 20% residual cellular material, then isolation of the nucleic acid to 80% is suitable. In some embodiments, the isolated nanoscale analyte comprises less than about 80%, less than about 70%, less than about 60%, less than about 50%, less than about 40%, less than about 30%, less than about 20%, less than about 10%, less than about 5%, or less than about 2% non-nanoscale analyte cellular material and/or protein by mass. In some embodiments, the isolated nanoscale analyte comprises greater than about 99%, greater than about 98%, greater than about 95%, greater than about 90%, greater than about 80%, greater than about 70%, greater than about 60%, greater than about 50%, greater than about 40%, greater than about 30%, greater than about 20%, or greater than about 10% nanoscale analyte by mass.

The nanoscale analytes are isolated in any suitable form including unmodified, derivatized, fragmented, non-fragmented, and the like. In some embodiments, when the nanoscale analyte is a nucleic acid, the nucleic acid is collected in a form suitable for sequencing. In some embodiments, the nucleic acid is collected in a fragmented form suitable for shotgun-sequencing, amplification or other manipulation. The nucleic acid may be collected from the device in a solution comprising reagents used in, for example, a DNA sequencing procedure, such as nucleotides as used in sequencing by synthesis methods.

In some embodiments, the methods described herein result in an isolated nanoscale analyte sample that is approximately representative of the nanoscale analyte of the starting sample. In some embodiments, the devices and systems described herein are capable of isolating nanoscale analyte from a sample that is approximately representative of the nanoscale analyte of the starting sample. That is, the population of nanoscale analytes collected by the method, or capable of being collected by the device or system, are substantially in proportion to the population of nanoscale analytes present in the cells in the fluid. In some embodiments, this aspect is advantageous in applications in which the fluid is a complex mixture of many cell types and the practitioner desires a nanoscale analyte-based procedure for determining the relative populations of the various cell types.

In some embodiments, the nanoscale analyte isolated by the methods described herein or capable of being isolated by the devices described herein has a concentration of at least 0.5 ng/mL. In some embodiments, the nanoscale analyte isolated by the methods described herein or capable of being isolated by the devices described herein has a concentration of at least 1 ng/mL. In some embodiments, the nanoscale analyte isolated by the methods described herein or capable of being isolated by the devices described herein has a concentration of at least 5 ng/mL. In some embodiments, the nanoscale analyte isolated by the methods described herein or capable of being isolated by the devices described herein has a concentration of at least 10 ng/ml.

In some embodiments, about 50 pico-grams of nanoscale analyte is isolated from a sample comprising about 5,000 cells using the methods, systems or devices described herein. In some embodiments, the methods, systems or devices described herein yield at least 10 pico-grams of nanoscale analyte from a sample comprising about 5,000 cells. In some embodiments, the methods, systems or devices described herein yield at least 20 pico-grams of nanoscale analyte from a sample comprising about 5,000 cells. In some embodiments, the methods, systems or devices described herein yield at least 50 pico-grams of nanoscale analyte from about 5,000 cells. In some embodiments, the methods, systems or devices described herein yield at least 75 pico-grams of nanoscale analyte from a sample comprising about 5,000 cells. In some embodiments, the methods, systems or devices described herein yield at least 100 pico-grams of nanoscale analyte from a sample comprising about 5,000 cells. In some embodiments, the methods, systems or devices described herein yield at least 200 pico-grams of nanoscale analyte from a sample comprising about 5,000 cells. In some embodiments, the methods, systems or devices described herein yield at least 300 pico-grams of nanoscale analyte from a sample comprising about 5,000 cells. In some embodiments, the methods, systems or devices described herein yield at least 400 pico-grams of nanoscale analyte from a sample comprising about 5,000 cells. In some embodiments, the methods, systems or devices described herein yield at least 500 pico-grams of nanoscale analyte from a sample comprising about 5,000 cells. In some embodiments, the methods, systems or devices described herein yield at least 1,000 pico-grams of nanoscale analyte from a sample comprising about 5,000 cells. In some embodiments, the methods, systems or devices described herein yield at least 10,000 pico-grams of nanoscale analyte from a sample comprising about 5,000 cells. In some embodiments, the methods, systems or devices described herein yield at least 20,000 pico-grams of nanoscale analyte from a sample comprising about 5,000 cells. In some embodiments, the methods, systems or devices described herein yield at least 30,000 pico-grams of nanoscale analyte from a sample comprising about 5,000 cells. In some embodiments, the methods, systems or devices described herein yield at least 40,000 pico-grams of nanoscale analyte from a sample comprising about 5,000 cells. In some embodiments, the methods, systems or devices described herein yield at least 50,000 pico-grams of nanoscale analyte from a sample comprising about 5,000 cells.

When the nanoscale analyte is a nucleic acid, the nucleic acid isolated using the methods described herein or capable of being isolated by the devices described herein is high-quality and/or suitable for using directly in downstream procedures such as DNA sequencing, nucleic acid amplification, such as PCR, or other nucleic acid manipulation, such as ligation, cloning or further translation or transformation assays. In some embodiments, the collected nucleic acid comprises at most 0.01% protein. In some embodiments, the collected nucleic acid comprises at most 0.5% protein. In some embodiments, the collected nucleic acid comprises at most 0.1% protein. In some embodiments, the collected nucleic acid comprises at most 1% protein. In some embodiments, the collected nucleic acid comprises at most 2% protein. In some embodiments, the collected nucleic acid comprises at most 3% protein. In some embodiments, the collected nucleic acid comprises at most 4% protein. In some embodiments, the collected nucleic acid comprises at most 5% protein.

Samples

In one aspect, the methods, systems and devices described herein isolate nanoscale analytes from a sample. In some embodiments, the sample comprises a fluid. In one aspect, the sample comprises cells or other particulate material and the nanoscale analytes. In some embodiments, the sample does not comprise cells.

In some embodiments, the sample is a liquid, optionally water or an aqueous solution or dispersion. In some embodiments, the sample is a bodily fluid. Exemplary bodily fluids include blood, serum, plasma, bile, milk, cerebrospinal fluid, gastric juice, ejaculate, mucus, peritoneal fluid, saliva, sweat, tears, urine, synovial fluid and the like. In some embodiments, nanoscale analytes are isolated from bodily fluids using the methods, systems or devices described herein as part of a medical therapeutic or diagnostic procedure, device or system. In some embodiments, the sample is tissues and/or cells solubilized and/or dispersed in a fluid medium. For example, the tissue can be a cancerous tumor from which nanoscale analytes, such as nucleic acids, can be isolated using the methods, devices or systems described herein.

In some embodiments, the sample is an environmental sample. In some embodiments, the environmental sample is assayed or monitored for the presence of a particular nucleic acid sequence indicative of a certain contamination, infestation incidence or the like. The environmental sample can also be used to determine the source of a certain contamination, infestation incidence or the like using the methods, devices or systems described herein. Exemplary environmental samples include municipal wastewater, industrial wastewater, water or fluid used in or produced as a result of various manufacturing processes, lakes, rivers, oceans, aquifers, ground water, storm water, plants or portions of plants, animals or portions of animals, insects, municipal water supplies, and the like.

In some embodiments, the sample is a food or beverage. The food or beverage can be assayed or monitored for the presence of a particular nanoscale analyte indicative of a certain contamination, infestation incidence or the like. The food or beverage can also be used to determine the source of a certain contamination, infestation incidence or the like using the methods, devices or systems described herein. In various embodiments, the methods, devices and systems described herein can be used with one or more of bodily fluids, environmental samples, and foods and beverages to monitor public health or respond to adverse public health incidences.

In some embodiments, the sample is a growth medium. The growth medium can be any medium suitable for culturing cells, for example lysogeny broth (LB) for culturing *E. coli*, Ham's tissue culture medium for culturing mammalian cells, and the like. The medium can be a rich medium, minimal medium, selective medium, and the like. In some embodiments, the medium comprises or consists essentially of a plurality of clonal cells. In some embodiments, the medium comprises a mixture of at least two species.

In some embodiments, the sample is water.

In some embodiments, the sample may also comprise other particulate material. Such particulate material may be, for example, inclusion bodies (e.g., ceroids or Mallory bodies), cellular casts (e.g., granular casts, hyaline casts, cellular casts, waxy casts and pseudo casts), Pick's bodies, Lewy bodies, fibrillary tangles, fibril formations, cellular debris and other particulate material. In some embodiments, particulate material is an aggregated protein (e.g., beta-amyloid).

The sample can have any conductivity including a high or low conductivity. In some embodiments, the conductivity is between about 1 μS/m to about 10 mS/m. In some embodiments, the conductivity is between about 10 μS/m to about 10 mS/m. In other embodiments, the conductivity is between about 50 μS/m to about 10 mS/m. In yet other embodiments, the conductivity is between about 100 μS/m to about 10 mS/m, between about 100 μS/m to about 8 mS/m, between about 100 μS/m to about 6 mS/m, between about 100 μS/m to about 5 mS/m, between about 100 μS/m to about 4 mS/m, between about 100 μS/m to about 3 mS/m, between about 100 μS/m to about 2 mS/m, or between about 100 μS/m to about 1 mS/m.

In some embodiments, the conductivity is about 1 μS/m. In some embodiments, the conductivity is about 10 μS/m. In some embodiments, the conductivity is about 100 μS/m. In some embodiments, the conductivity is about 1 mS/m. In other embodiments, the conductivity is about 2 mS/m. In some embodiments, the conductivity is about 3 mS/m. In yet other embodiments, the conductivity is about 4 mS/m. In some embodiments, the conductivity is about 5 mS/m. In some embodiments, the conductivity is about 10 mS/m. In still other embodiments, the conductivity is about 100 mS/m. In some embodiments, the conductivity is about 1 S/m. In other embodiments, the conductivity is about 10 S/m.

In some embodiments, the conductivity is at least 1 μS/m. In yet other embodiments, the conductivity is at least 10 μS/m. In some embodiments, the conductivity is at least 100 μS/m. In some embodiments, the conductivity is at least 1 mS/m. In additional embodiments, the conductivity is at least 10 mS/m. In yet other embodiments, the conductivity is at least 100 mS/m. In some embodiments, the conductivity is at least 1 S/m. In some embodiments, the conductivity is at least 10 S/m. In some embodiments, the conductivity is at most 1 μS/m. In some embodiments, the conductivity is at most 10 μS/m. In other embodiments, the conductivity is at most 100 μS/m. In some embodiments, the conductivity is at most 1 mS/m. In some embodiments, the conductivity is at most 10 mS/m. In some embodiments, the conductivity is at most 100 mS/m. In yet other embodiments, the conductivity is at most 1 S/m. In some embodiments, the conductivity is at most 10 S/m.

In some embodiments, the sample is a small volume of liquid including less than 10 ml. In some embodiments, the sample is less than 8 ml. In some embodiments, the sample is less than 5 ml. In some embodiments, the sample is less than 2 ml. In some embodiments, the sample is less than 1 ml. In some embodiments, the sample is less than 500 μl. In some embodiments, the sample is less than 200 μl. In some embodiments, the sample is less than 100 μl. In some embodiments, the sample is less than 50 μl. In some embodiments, the sample is less than 10 μl. In some embodiments, the sample is less than 5 μl. In some embodiments, the sample is less than 1 μl.

In some embodiments, the quantity of sample applied to the device or used in the method comprises less than about 100,000,000 cells. In some embodiments, the sample comprises less than about 10,000,000 cells. In some embodiments, the sample comprises less than about 1,000,000 cells. In some embodiments, the sample comprises less than about 100,000 cells. In some embodiments, the sample comprises less than about 10,000 cells. In some embodiments, the sample comprises less than about 1,000 cells.

In some embodiments, isolation of a nanoscale analyte from a sample with the devices, systems and methods described herein takes less than about 30 minutes, less than about 20 minutes, less than about 15 minutes, less than about 10 minutes, less than about 5 minutes or less than about 1 minute. In other embodiments, isolation of a nanoscale analyte from a sample with the devices, systems and methods described herein takes not more than 30 minutes, not more than about 20 minutes, not more than about 15 minutes, not more than about 10 minutes, not more than about 5 minutes, not more than about 2 minutes or not more than about 1 minute. In additional embodiments, isolation of a nanoscale analyte from a sample with the devices, systems and methods described herein takes less than about 15 minutes, preferably less than about 10 minutes or less than about 5 minutes.

Removal of Residual Material

In some embodiments, following isolation of the nanoscale analytes in a DEP field region, the method includes optionally flushing residual material from the isolated nanoscale analytes. In some embodiments, the devices or systems described herein are capable of optionally and/or comprising a reservoir comprising a fluid suitable for flushing residual material from the nanoscale analytes. "Residual material" is anything originally present in the sample, originally present in the cells, added during the procedure, created through any step of the process including but not limited to cells (e.g. intact cells or residual cellular material), and the like. For example, residual material includes intact cells, cell wall fragments, proteins, lipids, carbohydrates, minerals, salts, buffers, plasma, and the like. In some embodiments, a certain amount of nanoscale analyte is flushed with the residual material.

In some embodiments, the residual material is flushed in any suitable fluid, for example in water, TBE buffer, or the like. In some embodiments, the residual material is flushed with any suitable volume of fluid, flushed for any suitable period of time, flushed with more than one fluid, or any other variation. In some embodiments, the method of flushing residual material is related to the desired level of isolation of the nanoscale analyte, with higher purity nanoscale analyte requiring more stringent flushing and/or washing. In other embodiments, the method of flushing residual material is related to the particular starting material and its composition. In some instances, a starting material that is high in lipid requires a flushing procedure that involves a hydrophobic fluid suitable for solubilizing lipids.

In some embodiments, the method includes degrading residual material including residual protein. In some embodiments, the devices or systems are capable of degrading residual material including residual protein. For example, proteins are degraded by one or more of chemical degradation (e.g. acid hydrolysis) and enzymatic degradation. In some embodiments, the enzymatic degradation agent is a protease. In other embodiments, the protein degradation agent is Proteinase K. The optional step of degradation of residual material is performed for any suitable time, temperature, and the like. In some embodiments, the degraded residual material (including degraded proteins) is flushed from the isolated nanoscale analytes.

In some embodiments, the agent used to degrade the residual material is inactivated or degraded. In some embodiments, the devices or systems are capable of degrading or inactivating the agent used to degrade the residual material. In some embodiments, an enzyme used to degrade the residual material is inactivated by heat (e.g., 50 to 95° C. for 5-15 minutes). For example, enzymes including proteases, (for example, Proteinase K) are degraded and/or inactivated using heat (typically, 15 minutes, 70° C.). In some embodiments wherein the residual proteins are degraded by an enzyme, the method further comprises inactivating the degrading enzyme (e.g., Proteinase K) following degradation of the proteins. In some embodiments, heat is provided by a heating module in the device (temperature range, e.g., from 30 to 95° C.).

The order and/or combination of certain steps of the method can be varied. In some embodiments, the devices or methods are capable of performing certain steps in any order or combination. For example, in some embodiments, the residual material and the degraded proteins are flushed in separate or concurrent steps. That is, the residual material is flushed, followed by degradation of residual proteins, followed by flushing degraded proteins from the isolated nanoscale analytes. In some embodiments, one first degrades the residual proteins, and then flush both the residual material and degraded proteins from the nanoscale analytes in a combined step.

In some embodiments, the nanoscale analytes are retained in the device and optionally used in further procedures, such as PCR, enzymatic assays or other procedures that analyze, characterize or amplify the nanoscale analytes.

For example, in some embodiments, the isolated nanoscale analyte is a nucleic acid, and the devices and systems are capable of performing PCR or other optional procedures on the isolated nucleic acids. In other embodiments, the nucleic acids are collected and/or eluted from the device. In some embodiments, the devices and systems are capable of allowing collection and/or elution of nucleic acid from the device or system. In some embodiments, the isolated nucleic acid is collected by (i) turning off the second dielectrophoretic field region; and (ii) eluting the nucleic acid from the array in an eluant. Exemplary eluants include water, TE, TBE and L-Histidine buffer.

Assays and Applications

In some embodiments, a system or device described herein includes a means of performing enzymatic reactions. In other embodiments, a system or device described herein includes a means of performing polymerase chain reaction (PCR), isothermal amplification, ligation reactions, restriction analysis, nucleic acid cloning, transcription or translation assays, or other enzymatic-based molecular biology assay.

In some embodiments, a system or device described herein comprises a nucleic acid sequencer. The sequencer is optionally any suitable DNA sequencing device including but not limited to a Sanger sequencer, pyro-sequencer, ion semiconductor sequencer, polony sequencer, sequencing by ligation device, DNA nanoball sequencing device, sequencing by ligation device, or single molecule sequencing device.

In some embodiments, the methods described herein further comprise optionally amplifying the isolated nucleic acid by polymerase chain reaction (PCR). In some embodiments, the PCR reaction is performed on or near the array of electrodes or in the device. In some embodiments, the device or system comprise a heater and/or temperature control mechanisms suitable for thermocycling.

PCR is optionally done using traditional thermocycling by placing the reaction chemistry analytes in between two efficient thermoconductive elements (e.g., aluminum or silver) and regulating the reaction temperatures using TECs. Additional designs optionally use infrared heating through optically transparent material like glass or thermo polymers. In some instances, designs use smart polymers or smart glass that comprise conductive wiring networked through the substrate. This conductive wiring enables rapid thermal conductivity of the materials and (by applying appropriate DC voltage) provides the required temperature changes and gradients to sustain efficient PCR reactions. In certain instances, heating is applied using resistive chip heaters and other resistive elements that will change temperature rapidly and proportionally to the amount of current passing through them.

In some embodiments, used in conjunction with traditional fluorometry (ccd, pmt, other optical detector, and optical filters), fold amplification is monitored in real-time or on a timed interval. In certain instances, quantification of final fold amplification is reported via optical detection converted to AFU (arbitrary fluorescence units correlated to analyze doubling) or translated to electrical signal via impedance measurement or other electrochemical sensing.

Given the small size of the micro electrode array, these elements are optionally added around the micro electrode array and the PCR reaction will be performed in the main sample processing chamber (over the DEP array) or the analytes to be amplified are optionally transported via fluidics to another chamber within the fluidic cartridge to enable on-cartridge Lab-On-Chip processing.

In some instances, light delivery schemes are utilized to provide the optical excitation and/or emission and/or detection of fold amplification. In certain embodiments, this includes using the flow cell materials (thermal polymers like acrylic (PMMA) cyclic olefin polymer (COP), cyclic olefin co-polymer, (COC), etc.) as optical wave guides to remove the need to use external components. In addition, in some instances light sources—light emitting diodes—LEDs, vertical-cavity surface-emitting lasers—VCSELs, and other lighting schemes are integrated directly inside the flow cell or built directly onto the micro electrode array surface to have internally controlled and powered light sources. Miniature PMTs, CCDs, or CMOS detectors can also be built into the flow cell. This minimization and miniaturization enables compact devices capable of rapid signal delivery and detection while reducing the footprint of similar traditional devices (i.e. a standard bench top PCR/QPCR/Fluorometer).

Amplification on Chip

In some instances, silicon microelectrode arrays can withstand thermal cycling necessary for PCR. In some applications, on-chip PCR is advantageous because small amounts of target nucleic acids can be lost during transfer steps. In certain embodiments of devices, systems or processes described herein, any one or more of multiple PCR techniques are optionally used, such techniques optionally including any one or more of the following: thermal cycling in the flowcell directly; moving the material through microchannels with different temperature zones; and moving volume into a PCR tube that can be amplified on system or transferred to a PCR machine. In some instances, droplet PCR is performed if the outlet contains a T-junction that contains an immiscible fluid and interfacial stabilizers (surfactants, etc). In certain embodiments, droplets are thermal cycled in by any suitable method.

In some embodiments, amplification is performed using an isothermal reaction, for example, transcription mediated amplification, nucleic acid sequence-based amplification, signal mediated amplification of RNA technology, strand displacement amplification, rolling circle amplification, loop-mediated isothermal amplification of DNA, isothermal multiple displacement amplification, helicase-dependent amplification, single primer isothermal amplification or circular helicase-dependent amplification.

In various embodiments, amplification is performed in homogenous solution or as heterogeneous system with anchored primer(s). In some embodiments of the latter, the resulting amplicons are directly linked to the surface for higher degree of multiplex. In some embodiments, the amplicon is denatured to render single stranded products on or near the electrodes. Hybridization reactions are then optionally performed to interrogate the genetic information, such as single nucleotide polymorphisms (SNPs), Short Tandem Repeats (STRs), mutations, insertions/deletions, methylation, etc. Methylation is optionally determined by parallel analysis where one DNA sample is bisulfite treated and one is not. Bisulfite depurinates unmodified C becoming a U. Methylated C is unaffected in some instances. In some embodiments, allele specific base extension is used to report the base of interest.

Rather than specific interactions, the surface is optionally modified with nonspecific moieties for capture. For example, surface could be modified with polycations, i.e., polylysine, to capture DNA molecules which can be released by reverse bias (−V). In some embodiments, modifications to the surface are uniform over the surface or patterned specifically for functionalizing the electrodes or non electrode regions. In certain embodiments, this is accomplished with photolithography, electrochemical activation, spotting, and the like.

In some applications, where multiple chip designs are employed, it is advantageous to have a chip sandwich where the two devices are facing each other, separated by a spacer, to form the flow cell. In various embodiments, devices are run sequentially or in parallel. For sequencing and next generation sequencing (NGS), size fragmentation and selection has ramifications on sequencing efficiency and quality. In some embodiments, multiple chip designs are used to narrow the size range of material collected creating a band pass filter. In some instances, current chip geometry (e.g., 80 μm diameter electrodes on 200 μm center-center pitch (80/200) acts as 500 bp cutoff filter (e.g., using voltage and frequency conditions around 10 Vpp and 10 kHz). In such instances, a nucleic acid of greater than 500 bp is captured, and a nucleic acid of less than 500 bp is not. Alternate electrode diameter and pitch geometries have different cutoff sizes such that a combination of chips should provide a desired fragment size. In some instances, a 40 μm diameter electrode on 100 μm center-center pitch (40/100) has a lower cutoff threshold, whereas a 160 μm diameter electrode on 400 μm center-center pitch (160/400) has a higher cutoff threshold relative to the 80/200 geometry, under similar conditions. In various embodiments, geometries on a single chip or multiple chips are combined to select for a specific sized fragments or particles. For example a 600 bp cutoff chip would leave a nucleic acid of less than 600 bp in solution, then that material is optionally recaptured with a 500 bp cutoff chip (which is opposing the 600 bp chip). This leaves a nucleic acid population comprising 500-600 bp in solution. This population is then optionally amplified in the same chamber, a side chamber, or any other configuration. In some embodiments, size selection is accomplished using a single electrode geometry, wherein nucleic acid of >500 bp is isolated on the electrodes, followed by washing, followed by reduction of the ACEK high field strength (change voltage, frequency, conductivity) in order to release nucleic acids of <600 bp, resulting in a supernatant nucleic acid population between 500-600 bp.

In some embodiments, the chip device is oriented vertically with a heater at the bottom edge which creates a temperature gradient column. In certain instances, the bottom is at denaturing temperature, the middle at annealing temperature, the top at extension temperature. In some instances, convection continually drives the process. In some embodiments, provided herein are methods or systems comprising an electrode design that specifically provides for electrothermal flows and acceleration of the process. In some embodiments, such design is optionally on the same device or on a separate device positioned appropriately. In some instances, active or passive cooling at the top, via fins or fans, or the like provides a steep temperature gradient. In some instances the device or system described herein comprises, or a method described herein uses, temperature sensors on the device or in the reaction chamber monitor temperature and such sensors are optionally used to adjust temperature on a feedback basis. In some instances, such sensors are coupled with materials possessing different thermal transfer properties to create continuous and/or discontinuous gradient profiles.

In some embodiments, the amplification proceeds at a constant temperature (i.e, isothermal amplification).

In some embodiments, the methods disclosed herein further comprise sequencing the nucleic acid isolated as disclosed herein. In some embodiments, the nucleic acid is sequenced by Sanger sequencing or next generation sequencing (NGS). In some embodiments, the next generation sequencing methods include, but are not limited to, pyrosequencing, ion semiconductor sequencing, polony sequencing, sequencing by ligation, DNA nanoball sequencing, sequencing by ligation, or single molecule sequencing.

In some embodiments, the isolated nucleic acids disclosed herein are used in Sanger sequencing. In some embodiments, Sanger sequencing is performed within the same device as the nucleic acid isolation (Lab-on-Chip). Lab-on-Chip workflow for sample prep and Sanger sequencing results would incorporate the following steps: a) sample extraction using ACE chips; b) performing amplification of target sequences on chip; c) capture PCR products by ACE; d) perform cycle sequencing to enrich target strand; e) capture enriched target strands; f) perform Sanger chain termination reactions; perform electrophoretic separation of target sequences by capillary electrophoresis with on chip multi-color fluorescence detection. Washing nucleic acids, adding reagent, and turning off voltage is performed as necessary. Reactions can be performed on a single chip with plurality of capture zones or on separate chips and/or reaction chambers.

In some embodiments, the method disclosed herein further comprise performing a reaction on the nucleic acids (e.g., fragmentation, restriction digestion, ligation of DNA or RNA). In some embodiments, the reaction occurs on or near the array or in a device, as disclosed herein.

Other Assays

The isolated nucleic acids disclosed herein may be further utilized in a variety of assay formats. For instance, devices which are addressed with nucleic acid probes or amplicons may be utilized in dot blot or reverse dot blot analyses, base-stacking single nucleotide polymorphism (SNP) analysis, SNP analysis with electronic stringency, or in STR analysis. In addition, such devices disclosed herein may be utilized in formats for enzymatic nucleic acid modification, or protein-nucleic acid interaction, such as, e.g., gene expression analysis with enzymatic reporting, anchored nucleic acid amplification, or other nucleic acid modifications suitable for solid-phase formats including restriction endonuclease cleavage, endo- or exo-nuclease cleavage, minor groove binding protein assays, terminal transferase reactions, polynucleotide kinase or phosphatase reactions, ligase reactions, topoisomerase reactions, and other nucleic acid binding or modifying protein reactions.

In addition, the devices disclosed herein can be useful in immunoassays. For instance, in some embodiments, locations of the devices can be linked with antigens (e.g., peptides, proteins, carbohydrates, lipids, proteoglycans, glycoproteins, etc.) in order to assay for antibodies in a bodily fluid sample by sandwich assay, competitive assay, or other formats. Alternatively, the locations of the device may be addressed with antibodies, in order to detect antigens in a sample by sandwich assay, competitive assay, or other assay formats. As the isoelectric point of antibodies and proteins can be determined fairly easily by experimentation or pH/charge computations, the electronic addressing and electronic concentration advantages of the devices may be utilized by simply adjusting the pH of the buffer so that the addressed or analyte species will be charged.

In some embodiments, the isolated nucleic acids are useful for use in immunoassay-type arrays or nucleic acid arrays.

Electrode Arrays

Figure 12:
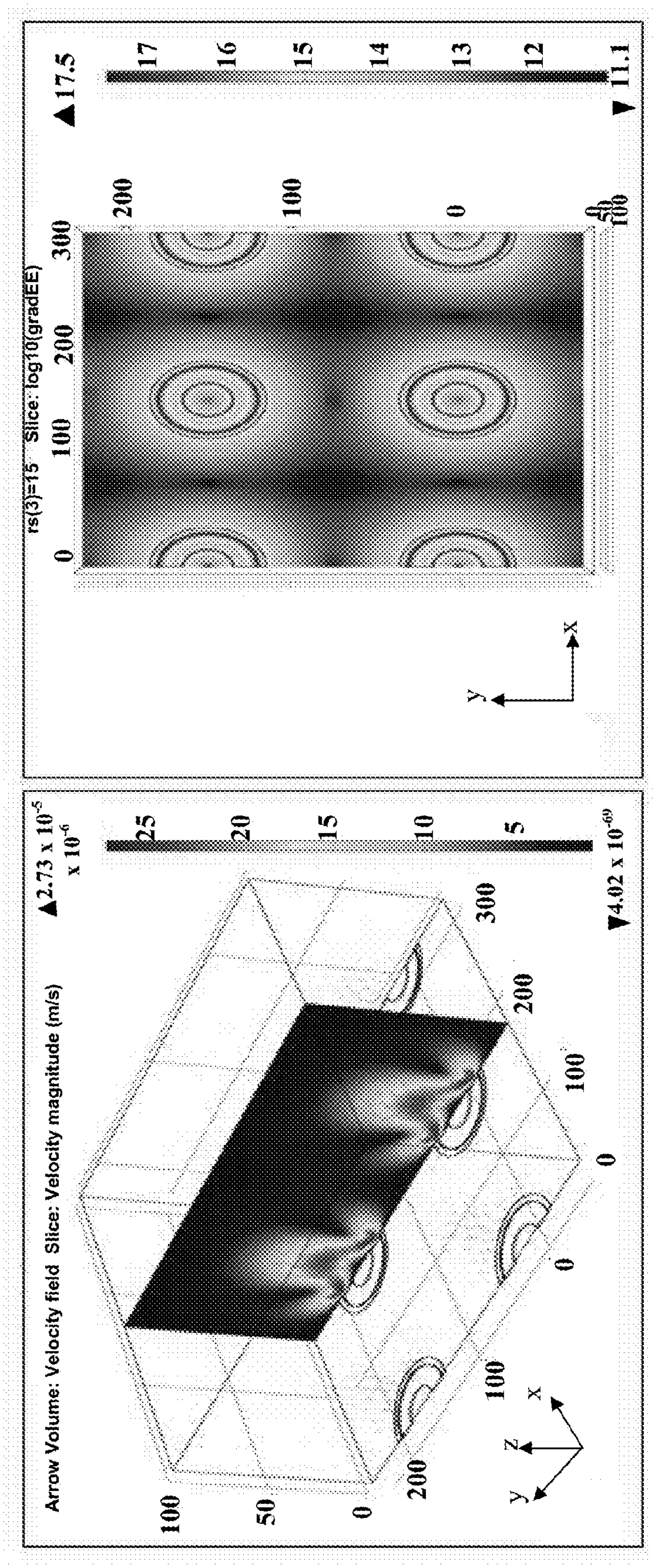
FIG. 12 exemplifiers a flow velocity profile (right) and a DEP gradient (right) generated by the microelectrode array with new floating electrode design.

In various embodiments, microelectrodes are arranged in an array. The advantages of microelectrode array deigns include increasing the gradient of an electric field generated while also reducing the AC electrothermal flow generated at any particular voltage. In an embodiment, the microelectrode array comprises a floating electrode, i.e., an electrode surrounding the working electrode by not being energized during ACE. FIG. 12 shows an example of flow velocity profile (left) and a DEP gradient generated by the microelectrode array with an alternating configuration of regular electrodes and floating electrodes. Table 1 shows the performance derived from different configurations of microarray electrode arrays.

TABLE 1

Comparison of performance parameters for different floating electrode designs and basic design with floating electrodes.

| Floating Electrode Width (μm) | Ring width (μm) | Max E-field (V/m) | Max Velocity (m/s) | Gradient of electric field ($mKg^2/s^6A^2$) | total current 2 × 2 (A) |
|---|---|---|---|---|---|
| 5 | 10 | 7.313E+05 | 2.443E−05 | 6.408E+18 | 8.46E−04 |
| 5 | 12.5 | 7.139E+05 | 2.662E−05 | 4.686E+18 | 8.72E−04 |
| 5 | 15 | 7.133E+05 | 2.729E−05 | 5.587E+18 | 8.89E−04 |
| 5 | 17.5 | 7.053E+05 | 2.793E−05 | 5.122E+18 | 9.01E−04 |
| 5 | 20 | 6.960E+05 | 2.803E−05 | 4.655E+18 | 9.09E−04 |
| 5 | N/A | 7.018E+05 | 2.798E−05 | 5.511E+18 | 9.17E−04 |
| Regular | | 4.614E+05 | 4.044E−05 | 6.569E+17 | 9.03E−04 |

As can been seen in Table 1, there is one order of magnitude increase in the gradient of electric field in comparison to the regular design, i.e., the microarray electrode array without a floating electrode. Employing floating electrodes in some embodiments, the DEP force ($F_{DEP}$) is greater or much great than the flow force ($F_{FLOW}$), thus allowing to use lower voltage to achieve capture. Based on the use of floating electrodes, systems or devices requiring low power consumption will be fabricated.

DEFINITIONS AND ABBREVIATIONS

The articles "a", "an" and "the" are non-limiting. For example, "the method" includes the broadest definition of the meaning of the phrase, which can be more than one method.

"Vp-p" is the peak-to-peak voltage.

"TBE" is a buffer solution containing a mixture of Tris base, boric acid and EDTA.

"TE" is a buffer solution containing a mixture of Tris base and EDTA.

"L-Histidine buffer" is a solution containing L-histidine.

"DEP" is an abbreviation for dielectrophoresis.

"ACE" is an abbreviation for Alternate Current Electrokinetics.

"ACET" is an abbreviation for AC electrothermal.

EXAMPLES

Example 1

Figure 5:
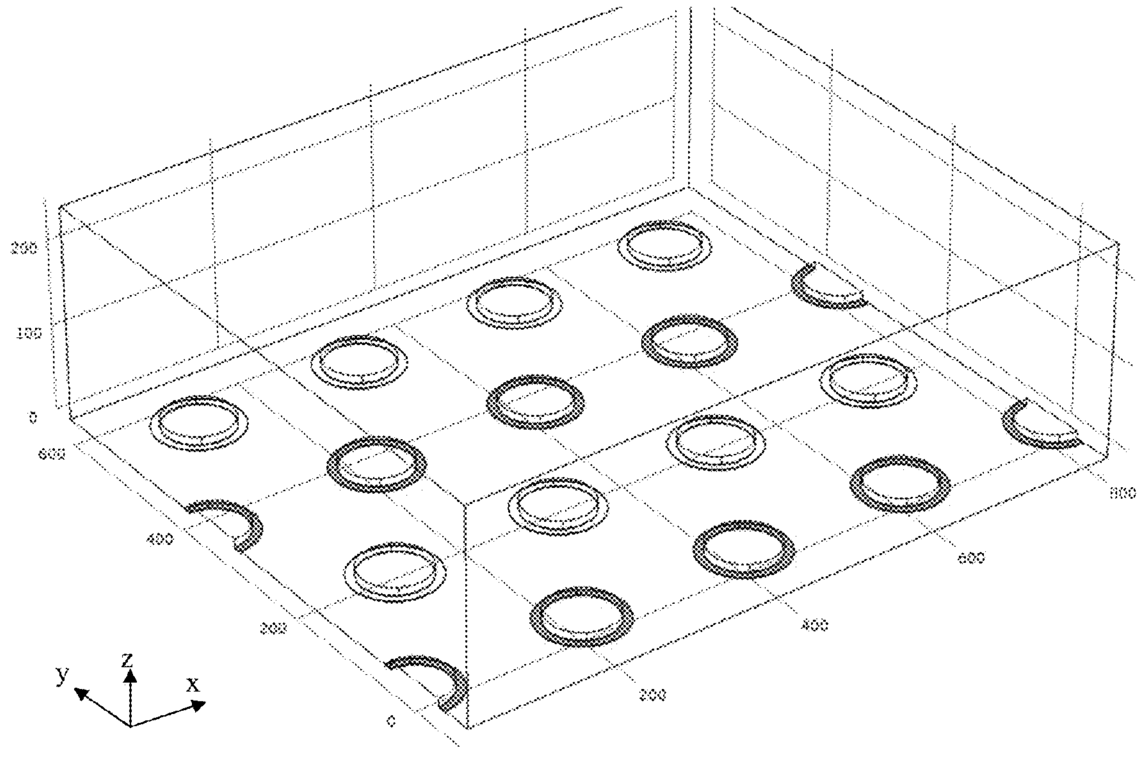
FIG. 5 exemplifies an array of electrodes wherein the electrodes are configured in the shape of a hollow ring with an extruded center. The electrodes comprise conductive material around the edges of the electrodes. The exemplified ring has a 10 μm annulus of exposed platinum. The color filled electrodes represent the anodes and the non-color filled electrodes represent the cathodes.
Figure 6:
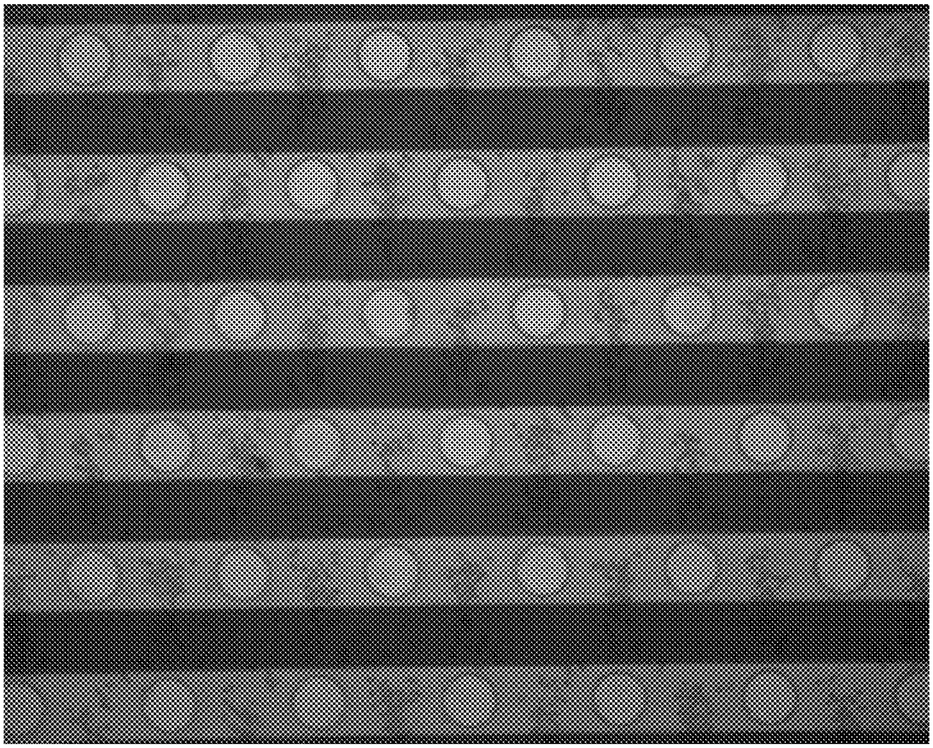
FIG. 6 exemplifies a bright field image of a microlectrode array comprising electrodes in a hollow disk configuration in an unknown sample chamber. The disks comprised exposed platinum. The "black dots" that appear in the image are red blood cells.
Figure 7:
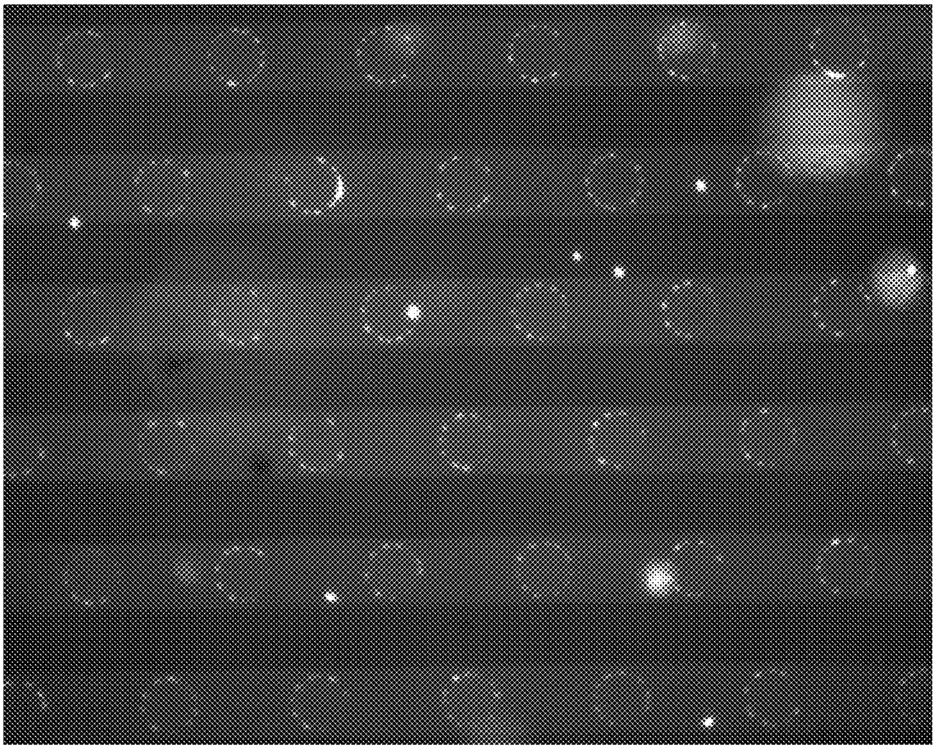
FIG. 7 exemplifies a fluorescent image of the microlectrode hollow disk array in the unknown sample chamber with nanoscale analyte isolated on the edge of each microelectrode.
Figure 8:
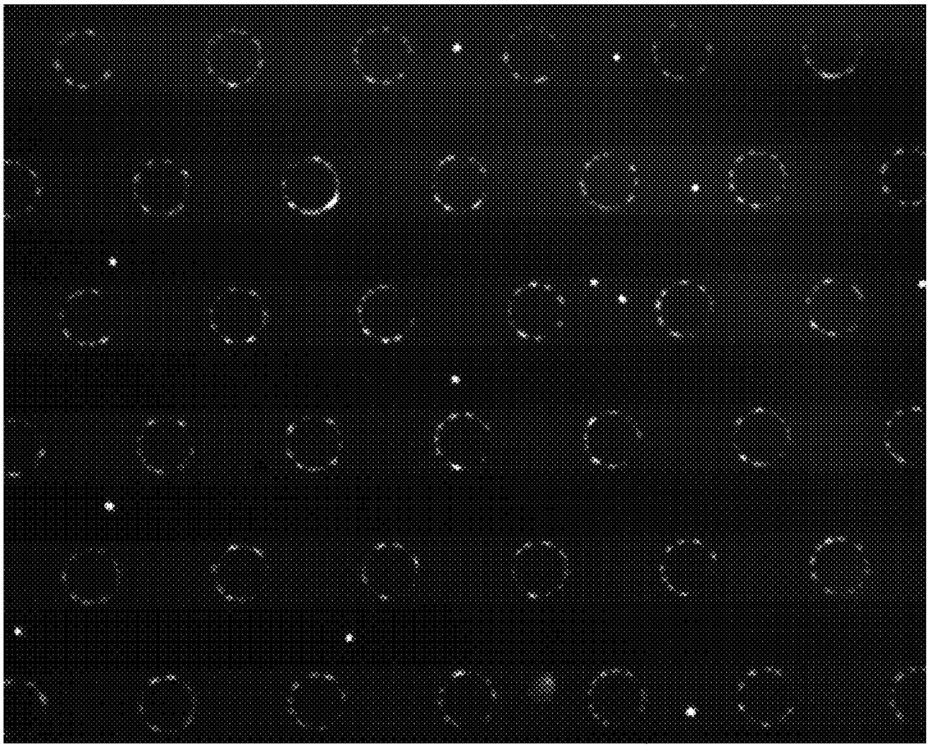
FIG. 8 exemplifies a fluorescent image of the microlectrode hollow disk array in the unknown sample chamber with nanoscale analyte isolated on the edge of each microelectrode at the end of the 20 minute process.
Figure 9:
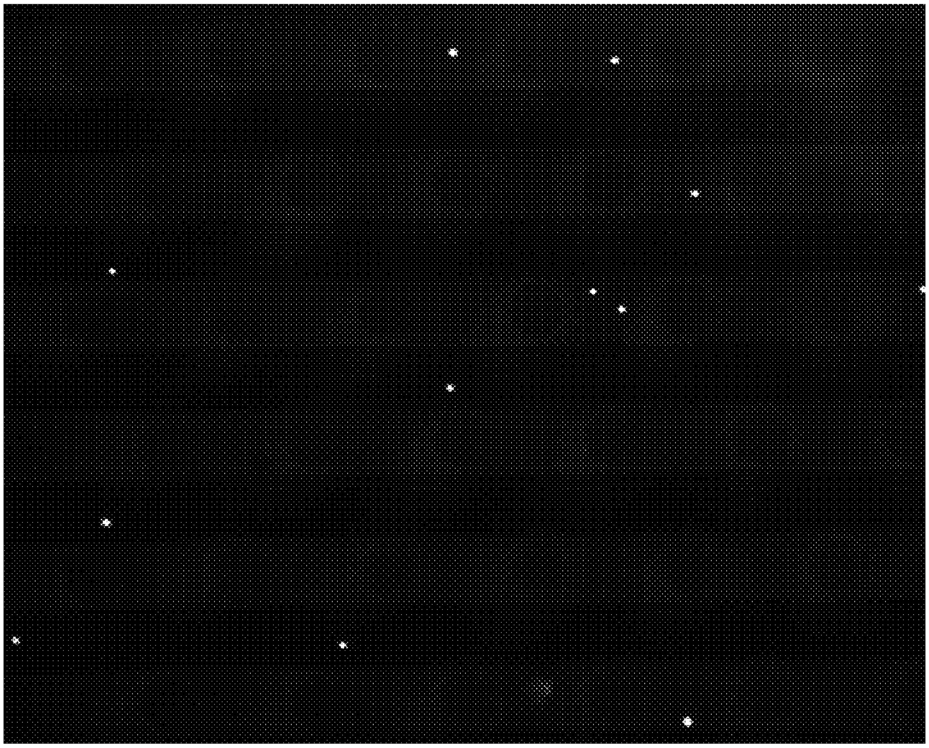
FIG. 9 exemplifies a fluorescent image of the microlectrode array in the unknown sample chamber after release of the nanoscale analyte from the edges of the electrode by termination of production of AC electrokinetics.
Figure 10:
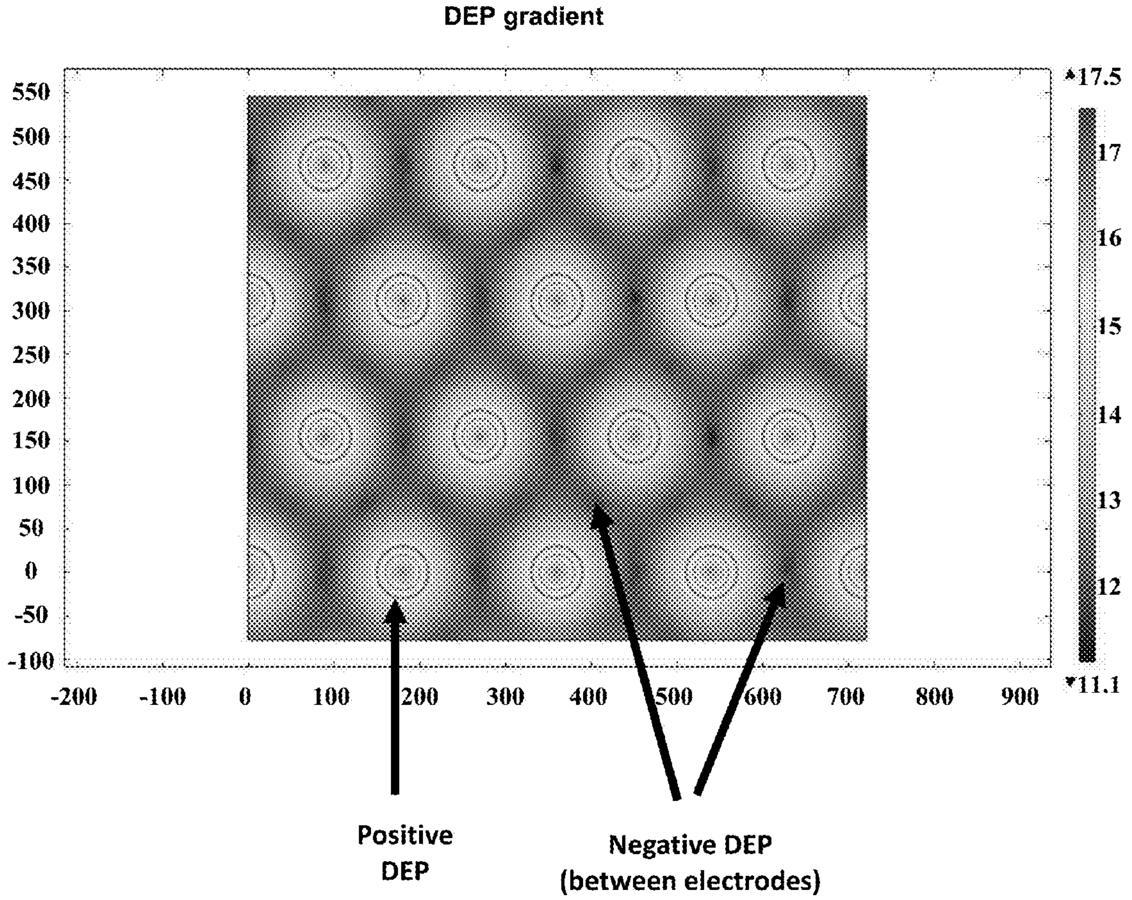
FIG. 10 exemplifies the DEP gradient on a microelectrode hollow disk array. The DEP gradient magnitude is represented by color. A positive DEP zone is located on the edge of the electrodes while a negative DEP zone is located between the electrodes.
Figure 11:
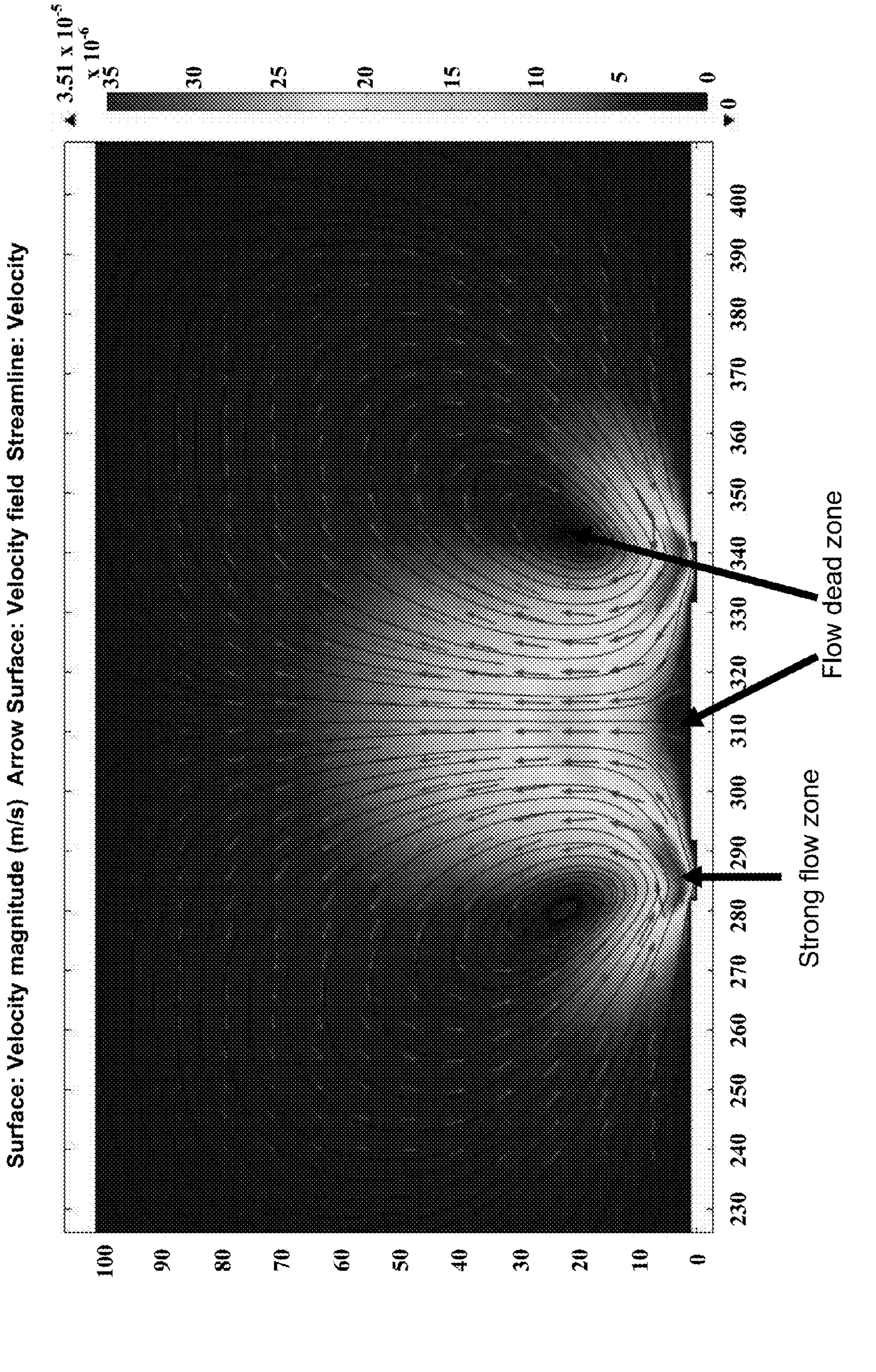
FIG. 11 exemplifies the ACET flow pattern in the electrode chamber. The magnitude of the flow is depicted by color, where the strongest flow is seen a few microns above the chamber edge, while flow dead zones are located in the vortices center and in the electrode ring center, as indicated by the arrows. Stream lines exemplify the vortices formed by the ACET effect. Red arrows indicate flow direction.

A two-chamber fluidics cartridge containing a hydrogel coated microlectrode array was loaded into an ATS system. The microelectrode array comprised electrodes in a hollow ring shape, as depicted in FIG. 5. In one chamber, a standard solution with conductivity of 0.8 S/m and spiked DNA (genomic purchased from Promega or Lambda purchased from BioLabs) at 25 pg/μL was loaded for a total volume of 530 μL. In the other chamber, an unknown sample in a bodily fluid (blood, serum, plasma, sputum, etc. . . . ) was loaded to a total of 530 μL. The DNA was stained at a ratio of 1:5000× using YOYO®-1 green fluorescent dye purchased from Life Technologies. Both liquids were run on the ATS system at 10 Volts peak-to-peak and 15 kHz for 10 minutes while flowing at a variable flow rate (5 to 250 μL/min) (FIGS. 6 and 7). The arrays were then washed with an isotonic buffer (water+ osmolites) for another 10 minutes at a variable flow rate in order to remove all matter that was not captured on the electrodes. At the end of the 20 minute process, an image of the microelectrode array was taken (one in each chamber) using a CCD camera with a 10× objective on a microscope using green fluorescent filters (FITC) (FIG. 8). This allowed for image quantification of the captured matter of the unknown sample in comparison to the known sample. After the ACE power was turned off and the captured matter was released from the microelectrode array (FIG. 9), the fluid into which the capture matter was released was retrieved from the cartridge and collected for subsequent analysis.

Example 2

Various electrode designs were tested according to the methods described in Example 1. Generally, electrode geometry that increased $F_{DEP}$ while attenuating $F_{FLOW}$ enabled the stronger capture of nanoscale analytes. Below is a description of ACE performance difference between electrode designs.

TABLE 2

Description of ACE performance differences between electrode designs.

| Electrode Design | Remarks |
|---|---|
| Hollow Disk | Standard electrode geometry as shown in FIGS. 1, 6, 7, 8 |
| Hollow Ring | Increased surface area for nanoscale analyte capture. Modification of flow pattern. Shown in FIG 2. |
| Wavy Line | Provides larger surface area for nanoscale analyte capture. Generates uni-axial flow. Shown in FIGS. 3 & 4. |
| Hollow ring with extruded center | Reduces the ACET and ACEO. Shown in FIG. 5. |
| Blocked Electrode | Reduces the ACET and ACEO. Not shown. |
| Floating Electrode | Reduces ACET and ACEO, collectively $F_{FLOW}$, while increasing $F_{DEP}$. Shown in FIG. 12. |

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A device for isolating a nanoscale analyte in a sample, the device comprising:

a. a housing; and b. alternating current (AC) electrodes within the housing, wherein the AC electrodes are configured to be selectively energized to establish AC electrokinetic high field and AC electrokinetic low field regions, and the AC electrodes comprise conductive material within the AC electrodes for reducing, disrupting or altering fluid flow around or within the vicinity of the AC electrodes as compared to fluid flow in regions between or substantially beyond the vicinity, wherein the conductive material is substantially absent from the center of the individual AC electrodes and the AC electrodes are configured in three-dimensions.

2. The device of claim 1, wherein the individual AC electrodes are configured in a hollow ring shape.

3. The device of claim 1, wherein the individual AC electrodes are configured in a hollow tube shape.

4. The device of claim 1, wherein the AC electrodes further comprise non-conductive material.

5. The device of claim 4, wherein the non-conductive material surrounds the conductive material within the AC electrodes and serves as a physical barrier to the conductive material.

6. The device of claim 4, wherein the conductive material within the AC electrodes fills depressions in the non-conductive material.

7. The device of claim 1, wherein the conductive material of the three-dimensional AC electrodes increases the total surface area of the conductive material within the AC electrodes.

8. The device of claim 1, wherein the conductive material within the AC electrodes is configured at an angle.

9. The device of claim 1, wherein the conductive material within the AC electrodes is configured into angles between neighboring planar electrode surfaces of equal to or less than 180 degrees and equal to or more than 60 degrees.

10. The device of claim 1, wherein the conductive material within the AC electrodes is configured into a depressed concave shape.

11. The device of claim 1, wherein the individual AC electrodes are 40 μm to 100 μm in diameter.

12. The device of claim 1, wherein the AC electrodes are in non-circular configurations.

13. The device of claim 12, wherein an orientation angle between the non-circular configurations is between 25 and 90 degrees.

14. The device of claim 13, wherein the non-circular configurations comprise a wavy line configuration or a repeating unit comprising a shape of a pair of dots connected by a linker.

15. The device of claim 14, wherein the linker tapers inward toward the midpoint between the pair of dots.

16. The device of claim 15, wherein the diameters of the dots are the widest points along the length of the repeating unit.

17. The device of claim 16, wherein an edge to edge distance between a parallel set of repeating units is equidistant, or roughly equidistant.

18. The device of claim 1, wherein the AC electrodes comprise one or more floating electrodes.

19. The device of claim 18, wherein the floating electrodes are not energized to establish AC electrokinetic regions.

20. The device of claim 18, wherein a floating electrode surrounds an energized electrode.

21. The device of claim 18, wherein the floating electrodes induce an electric field with a higher gradient than an electric field induced by non-floating electrodes.

22. A method for isolating a nanoscale analyte in a sample, the method comprising:

a. applying the sample to a device, the device comprising an array of electrodes capable of establishing an AC electrokinetic field region the AC electrodes are configured to be selectively energized to establish AC electrokinetic high field and AC electrokinetic low field regions, and the AC electrodes comprise conductive material within the AC electrodes for reducing, disrupting or altering fluid flow around or within the vicinity of the AC electrodes as compared to fluid flow in regions between or substantially beyond the vicinity, wherein the conductive material is substantially absent from the center of the individual AC electrodes and the AC electrodes are configured in three-dimensions;

b. producing at least one AC electrokinetic field region, wherein the at least one AC electrokinetic field region is a dielectrophoretic high field region; and c. isolating the nanoscale analyte in the dielectrophoretic high field region.

23. The method of claim 22, wherein the conductive material is configured in an open disk shape, a hollow ring shape, a hollow tube shape or combinations thereof.

24. The method of claim 22, wherein a reduction in conductive material within the electrodes results in reduced fluid flow in and around surfaces of the electrodes, leading to an increase in nanoscale analyte capture on the surfaces.

25. The method of claim 22, further comprising lysing cells on the array, wherein the cells are lysed using a direct current, a chemical lysing agent, an enzymatic lysing agent, heat, pressure, sonic energy, or a combination thereof.

26. The method of claim 22, wherein the array of electrodes further comprises non-conductive material.

27. The method of claim 26, wherein the non-conductive material surrounds the conductive material within the electrodes and serves as a physical barrier to the conductive material.

28. The method of claim 22, wherein the sample comprises a fluid.

29. The method of claim 28, wherein conductivity of the fluid is greater than or equal to 100 mS/m.

30. The method of claim 22, wherein the nanoscale analyte is a nucleic acid.

* * * * *